United States Patent
Ohta et al.

(10) Patent No.: US 7,561,582 B2
(45) Date of Patent: Jul. 14, 2009

(54) DATA RECEPTION DEVICE

(75) Inventors: Yoshitaka Ohta, Osaka (JP); Yasuo Hamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 531 days.

(21) Appl. No.: 10/580,467

(22) PCT Filed: Jan. 5, 2005

(86) PCT No.: PCT/JP2005/000033
§ 371 (c)(1),
(2), (4) Date: May 25, 2006

(87) PCT Pub. No.: WO2005/067252
PCT Pub. Date: Jul. 21, 2005

(65) Prior Publication Data
US 2007/0121661 A1    May 31, 2007

(30) Foreign Application Priority Data
Jan. 7, 2004    (JP) .............................. 2004-002431

(51) Int. Cl.
*H04L 7/02*    (2006.01)
(52) U.S. Cl. .................. 370/395.62; 370/324; 370/468; 370/350; 375/359; 375/376; 375/354; 375/373; 375/358; 713/600
(58) Field of Classification Search ................. 375/376, 375/373, 252, 362; 370/230–234
See application file for complete search history.

(56) References Cited

U.S. PATENT DOCUMENTS

| | | | | |
|---|---|---|---|---|
| 5,577,080 A | * | 11/1996 | Sakaue et al. ................ 375/376 |
| 5,640,388 A | * | 6/1997 | Woodhead et al. ........... 370/468 |
| 5,680,076 A | * | 10/1997 | Kelkar et al. .................. 331/25 |
| 5,822,317 A | * | 10/1998 | Shibata ................... 370/395.62 |
| 5,946,358 A | * | 8/1999 | Horimoto .................... 375/316 |
| 5,966,387 A | * | 10/1999 | Cloutier ...................... 370/516 |
| 6,100,736 A | * | 8/2000 | Wu et al. ..................... 327/159 |
| 6,219,422 B1 | * | 4/2001 | Sato ............................ 380/240 |
| 6,404,711 B1 | * | 6/2002 | Kato ........................ 369/47.31 |
| 6,574,225 B2 | * | 6/2003 | Reynolds et al. ........ 370/395.62 |
| 6,581,164 B1 | * | 6/2003 | Felts et al. ................... 713/400 |

(Continued)

FOREIGN PATENT DOCUMENTS

JP    2002-281077    9/2002

(Continued)

*Primary Examiner*—Hassan Kizou
*Assistant Examiner*—Zewdu Beyen
(74) *Attorney, Agent, or Firm*—Wenderoth, Lind, Ponack, L.L.P.

(57) ABSTRACT

A data reception device having a reception data buffer unit storing a plurality of packets contained in a data packet, a reception data amount measuring unit measuring the data amount stored in the reception data buffer unit, a variable clock generation unit generating a clock having a variable frequency, a time information output unit outputting second time information counted in accordance with the frequency of the clock generated by the variable clock generation unit, and a first time information comparison unit comparing the first time information added to the packets with the second time information outputted from the time information output unit and controlling the timing of outputting the packet stored in the reception data buffer unit. The reception data amount measuring unit controlling the frequency of the clock generated by the variable clock generation unit in accordance with measured values obtained by the reception data amount measuring unit.

11 Claims, 14 Drawing Sheets

U.S. PATENT DOCUMENTS

| | | | |
|---|---|---|---|
| 6,675,314 B1 * | 1/2004 | Yamada et al. | 713/600 |
| 7,167,031 B2 * | 1/2007 | Ishii | 327/149 |
| 7,362,838 B2 * | 4/2008 | Mizukami et al. | 375/362 |
| 7,379,463 B2 * | 5/2008 | Tomita | 370/395.64 |
| 7,447,164 B2 * | 11/2008 | Ueda et al. | 370/252 |
| 2003/0035485 A1 * | 2/2003 | Honmura et al. | 375/240.25 |
| 2005/0117583 A1 * | 6/2005 | Uchida et al. | 370/395.4 |
| 2005/0237937 A1 * | 10/2005 | Van Gestel | 370/235 |

FOREIGN PATENT DOCUMENTS

| | | |
|---|---|---|
| JP | 2003-060652 | 2/2003 |
| JP | 2003-249922 | 9/2003 |

* cited by examiner

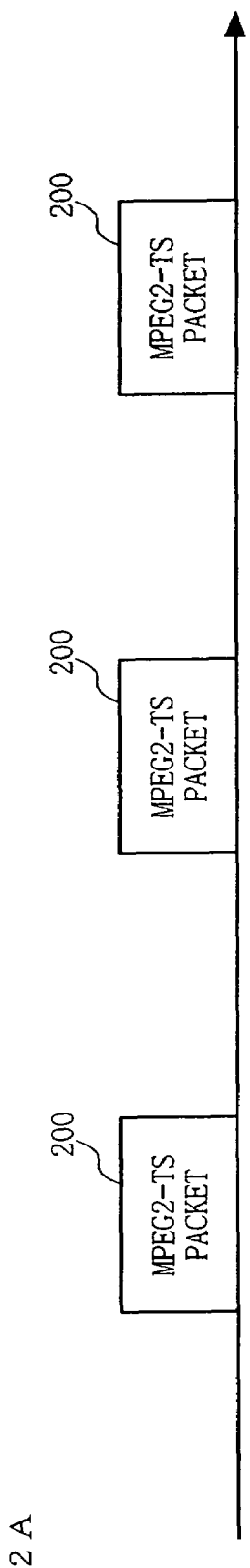

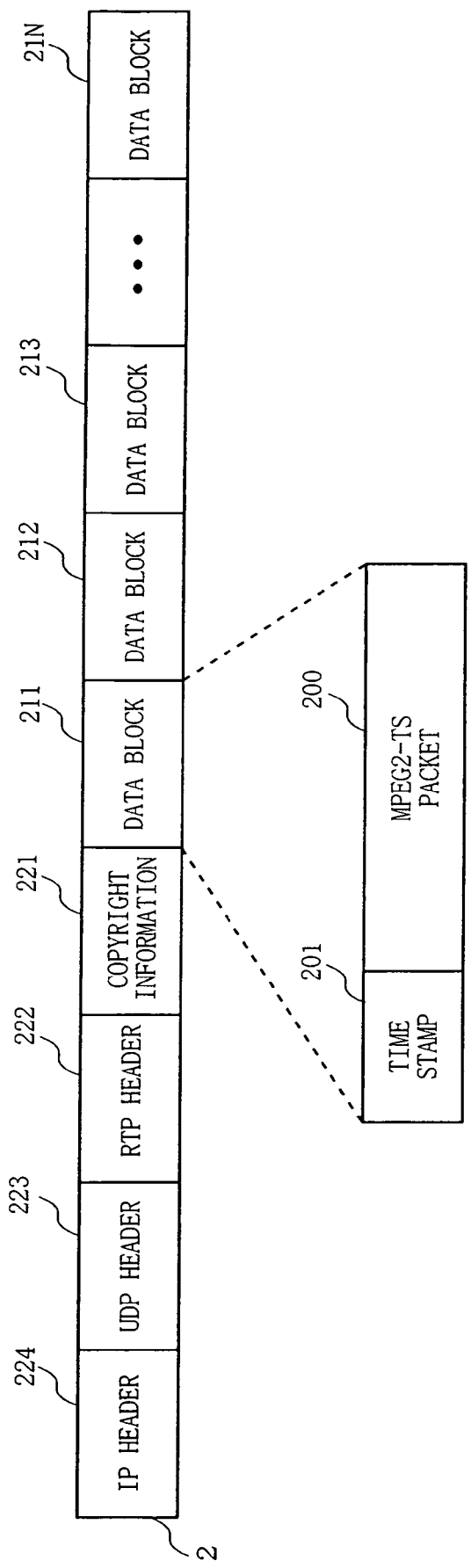

DATA RECEPTION DEVICE

BACKGROUND OF THE INVENTION

1. Field of the Invention

The present invention relates to a data reception device for receiving a video signal and an audio signal in MPEG2-TS or the like, which are transmitted via a wired line or a wireless line, and more particularly, relates to a data reception device which is capable of ensuring synchronization of transmitted video signals and audio signals or the like.

2. Description of the Related Art

Conventionally, in order to transmit a video signal, an audio signal, or the like via a wireless line such as a wireless local area network, which is typically in accordance with IEEE802.11, there has existed a technique for realizing synchronization of signals between a transmitting side and a receiving side (for example, refer to a patent document 1).

FIG. 11 is a block diagram illustrating a functional structure of the conventional wireless master device 900, described in patent document 1 (Japanese Laid-Open Publication No. 2003-60652), on a transmitting side. FIG. 12 is a block diagram illustrating a functional structure of the conventional wireless slave device 920, described in the patent document 1, on a receiving side. FIG. 13 is a diagram showing a frame structure of the conventional data packet 990, described in the patent document 1, transmitted from a wireless mater station. Hereinafter, with reference to FIG. 11, FIG. 12, and FIG. 13, operations of the wireless mater device 900 and the wireless slave device 920 in the patent document 1 will be described.

On the wireless master device 900, a video signal inputted to an MPEG2-TS encoding unit 901 is converted to an MPEG2-TS packet 950 and outputted. A time stamp addition unit 902 adds to the MPEG2-TS packet 950a time stamp 951 in accordance with time at which the MPEG2-TS packet 950 is outputted from the MPEG2-TS encoding unit 901. The time stamp 951 added here contains a timer value from a beacon timer unit 908.

A communication protocol processing unit 903 holds together, as one data block 941, the MPEG2-TS packet 950 with the time stamp 951 added, combines a data block 941 and a plurality of data blocks 942 to 94N, adds a data header 980 therein, and outputs a resultant. A frame assembling unit 909 in an MAC processing unit 904 adds an MAC header 970 to the resultant outputted from the communication protocol processing unit 903 and outputs a resultant. An RF unit 905 adds a physical layer header 960 to the resultant outputted from the frame assembling unit 909 and outputs a resultant. An antenna 906 emits the resultant outputted from the RF unit 905 as a wireless signal into a wireless communication line.

A clock generation unit 907 generates and inputs a clock to the beacon timer unit 908. Based on the clock, the beacon timer unit 908 sets and outputs a current timer value (for example, current time). A beacon generation unit 910 generates a beacon containing the timer value outputted from the beacon timer unit 908. The frame assembling unit 909 adds a MAC header to the beacon generated by the beacon generation unit 910 and outputs a resultant. The RF unit 905 adds the physical layer header 960 to the resultant outputted from the frame assembling unit 909. The antenna 906 emits the resultant outputted from the RF unit 905 as a beacon signal into the wireless communication line.

On the wireless slave device 920, the wireless signal transmitted via the wireless communication line is received by an antenna 921. The wireless signal received by the antenna 921 is inputted via an RF unit 922 to a frame analysis (analyzing) unit 925 in an MAC processing unit 923. The frame analysis unit 925 analyzes whether or not a destination of the received signal is the wireless slave device 920. When the destination is the wireless slave device 920, the frame analysis unit 925 inputs the received signal to a receive data processing unit 927. When the received signal is a data packet 990, the receive data processing unit 927 inputs the data packet 990 to a communication protocol processing unit 924. On the other hand, the received signal is a beacon signal, when the receive data processing unit 927 inputs the beacon signal to a beacon timer unit 926.

The communication protocol processing unit 924 analyzes a physical layer header 960, a MAC header 970, and a data header 980 in the received data packet 990, extracts data blocks 941 to 94N, and stores the extracted data blocks 941 to 94N in a receive data buffer unit 933.

Based on a clock outputted from a clock generation unit 928, the beacon timer unit 926 sets a current timer value (for example, current time). When the beacon signal is inputted from the receive data processing unit 927, the beacon timer unit 926 updates the current timer value so that the current timer value and a timer value contained in the beacon signal match with each other. Thereby the beacon timer unit 908 on the wireless master device 900 synchronizes with the beacon timer unit 926 on the wireless slave device 920.

A PLL processing unit 929 performs PLL processing for the timer value from the beacon timer unit 926 and inputs the processed timer value to a timer unit 930. The timer unit 930 inputs the current timer value, for which the PLL processing has been performed, to a time stamp comparison unit 931. A time stamp extraction unit 932 extracts a time stamp contained in a data block which has been stored in the receive data buffer unit 933. The time stamp comparison unit 931 determines whether or not the timer value contained in the time stamp which the time stamp extraction unit 932 has extracted and the current timer value inputted from the timer unit 930 match with each other. When a timer value contained in the time stamp matches with an ever-changing current timer value, the time stamp comparison unit 931 outputs to the receive data buffer unit 933 an MPEG2-TS packet in the data block containing the time stamp whose timer value matches with an ever-changing current timer value. An MPEG2-TS decoding unit 934 decodes the MPEG2-TS packet outputted from the receive data buffer unit 933 and outputs a video signal.

Thus, the wireless slave device 920 is capable of coinciding a time interval between MPEG2-TS packets inputted to the MPEG2-TS decoding unit with a time interval between MPEG2-TS packets outputted from the MPEG2-TS encoding unit 901 on the wireless master device 900.

Incidentally, the MPEG2-TS packet contains system clock information (PCR: Program Clock Reference) for the MPEG2-TS decoding unit 901. Based on this system clock information, the MPEG2-TS decoding unit 934 reproduces a system clock for the MPEG2-TS encoding unit 901.

In order to reproduce the system clock, however, a fluctuation in transmission time during which respective MPEG2-TS packets are transmitted must be sufficiently small. In ISO/IEC13818 Part 9 (MPEG2 Extension for real time interface), a value of the fluctuation in the transmission time is specified as 25 microseconds or less.

As described above, in the conventional data transmission system, the wireless master device 900 on the transmitting side adds to an MPEG2-TS packet a time stamp based on a beacon timer value. The wireless slave device 920 on the receiving side, using the beacon timer value which has matched with that of the wireless master device 900, controls timing of outputting an MPEG2-TS packet based on the time stamp of the MPEG2-TS packet. Therefore, it is possible to compensate a gap, on time axis, occurring when a plurality of MPEG-TS packets are combined to a packet to be wirelessly transmitted and a fluctuation in transmission time occurring on a transmission line. Therefore on the receiving side, an original time interval between MPEG2-TS packets can be reproduced, enabling synchronization of video signals and audio signals transmitted between the transmitting side and the receiving side.

BRIEF SUMMARY OF THE INVENTION

In a system in which transmission and reception of a beacon signal is not performed, for example, as in Ethernet (registered trademark) or the like, it is impossible to compensate, by using the conventional technique, a gap in a time interval between MPEG2-TS packets.

Therefore, an object of the present invention is to provide a data reception device which even in a system such as Ethernet (registered trademark), where matching of timer values is not performed by using the beacon signal or the like, is capable of compensating a gap in a time interval between packets, reproducing, on a receiving side, intervals between packets on a transmitting side, and synchronizing transmitted video and audio signals or the like between a transmitting side and a receiving side.

To achieve the above objects, the present invention has the following aspects. The present invention is a data reception device for receiving a data packet containing a plurality of packets, wherein first time information regarding time at which packets are generated is added to the plurality of packets, respectively, the data reception device comprising: a receive data buffer unit for storing the plurality of packets contained in the data packet; a receive data amount measuring unit for measuring a data amount stored in the receive data buffer unit; a variable clock generation unit for generating a clock whose frequency is variable; a time information output unit for outputting second time information counted in accordance with a frequency of the clock generated by the variable clock generation unit; and first time information comparison unit for comparing the first time information added to the packet with the second time information outputted from the time information output unit and for controlling timing of outputting the packet stored in the receive data buffer unit, wherein the receive data amount measuring unit controls a frequency of the clock generated by the variable clock generation unit in accordance with values measured by the receive data amount measuring unit.

According to the present invention, provided is a data reception device, which even in a system, where matching of timer values is not performed by using the beacon signal or the like, is capable of compensating a gap in a time interval between packets, reproducing, on a receiving side, intervals between packets on a transmitting side, and synchronizing transmitted video and audio signals or the like between a transmitting side and a receiving side.

Preferably, the second time information outputted by the time information comparison unit may be behind by a predetermined offset time.

Thereby even if a data packet arrives late, the data reception device can output the packet.

Preferably, the time information output unit may comprise: a timer unit for outputting third time information counted in accordance with a frequency of the clock generated by the variable clock generation unit; a time information extraction unit for extracting the first time information added to the packet stored in the receive data buffer unit; an initialization unit for coinciding the third time information outputted by the timer unit with the first time information extracted by the time information extraction unit; and an offset unit for outputting the second time information by delaying, by the predetermined offset time, the third time information outputted by the timer unit.

Thereby, since initialization is performed, time information on the transmitting side and time information on the receiving side approximately coincide. Further, since the second time information is delayed by the offset time, even if the data packet arrives late, the data reception device can output the packet.

Preferably, the offset unit may change the predetermined offset time in accordance with conditions of the transmission line to which the data reception device is connected.

Thereby, even if a delay time changes, the data reception device can output the packet.

Preferably, the offset unit may change the predetermined offset time in accordance with a data amount accumulated in the receive data buffer unit.

Thereby, even if a delay time changes, the data reception device can output the packet.

Preferably, the offset unit may change the predetermined offset time in accordance with a kind of a communication protocol.

Thereby, even if a delay time changes, the data reception device can output the packet.

Preferably, the data reception device may comprise a second time information comparison unit for comparing the third time information outputted by the timer unit with the first time information extracted by the time information extraction unit and for controlling, based on a comparison result, a frequency of the clock generated by the variable clock generation unit.

Thereby, the third time information outputted by the timer unit and time information on the transmitting side can coincide, and a gap in intervals between packets is compensated.

Preferably, until a predetermined time from a time point of starting reception of the data packet has passed, a frequency of the clock generated by the variable clock generation unit may be controlled by the second time information comparison unit, and after the predetermined time from the time point of starting reception of the data packet has passed, the frequency of the clock generated by the variable clock generation unit may be controlled by the receive data amount measuring unit.

Thereby, until packets have been accumulated to some degree, a frequency of a clock is controlled using a time difference and after packets have been accumulated to some degree, the frequency of the clock is controlled in accordance with a data amount, enabling the clock to be controlled in a stable manner.

Preferably, after the predetermined time has passed, the receive data amount measuring unit may start controlling the frequency of the clock generated by the variable clock generation unit.

Thereby, controlling the clock in a stable manner is enabled.

The receive data amount measuring unit may control the frequency of the clock generated by the variable clock generation unit by using an average value, as a measured value, of data amounts accumulated in the receive data buffer unit.

Thereby, controlling the clock in a stable manner is enabled.

For example, packets contained in the data packet are MPEG2-TS packets.

For example, as a data packet, audio signals and/or video signals are encoded to be generated as a plurality of MPEG2-TS packets to each of which first time information regarding time at encoding time is added, and the plurality of MPEG2-TS packets with the first time information added are combined and transmitted from the data transmission device which is operable to generate the data packets.

An integrated circuit for receiving a data packet containing a plurality of packets, wherein first time information regarding time at which the packets are generated is each added to the plurality of packets, the integrated circuit comprising: a receive data amount measuring unit for measuring a data amount stored in a receive data buffer unit, which is connected to the integrated circuit, for storing the plurality of packets contained in the data packet; a variable clock generation unit for generating a clock whose frequency is variable; a time information output unit for outputting second time information counted in accordance with a frequency of the clock generated by the variable clock generation unit; and a first time information comparison unit for comparing the first time information with the second time information outputted by the time information output unit and for controlling the packet stored in the receive data buffer unit, wherein the receive data amount measuring unit controls a frequency of the clock generated by the variable clock generation unit in accordance with a value measured by the receive data amount measuring unit.

Since in stream transmission of video and audio signals or the like via an asynchronous transmission line, the data reception device according to the present invention is capable of reproducing, on a receiving side, intervals between packets transmitted on a transmitting side, when MPEG2-TS packets or the like are transmitted via the asynchronous transmission line, the data reception device can reproduce correctly the signals on the receiving side.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2A is a diagram illustrating a data configuration of a plurality of MPEG2-TS packets outputted by an MPEG2-TS encoding unit.

FIG. 3 is a diagram illustrating an example of a data structure of a data packet 2 (IP packet) IP-packetized by a communication protocol processing unit 104.

DETAILED DESCRIPTION OF THE INVENTION

Hereinafter, with reference to figures, embodiments of the present invention will be described.

First Embodiment

Figure 1:
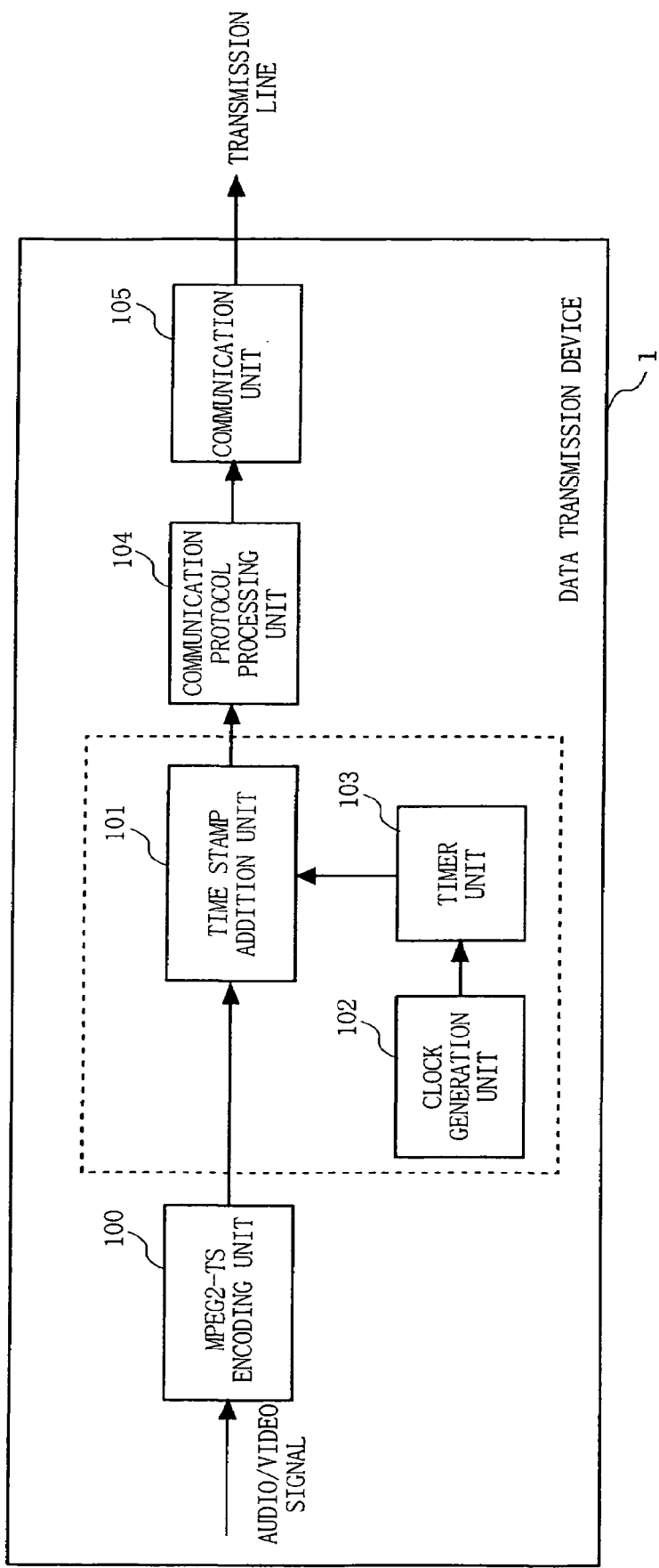
FIG. 1 is a block diagram illustrating a functional structure of a data transmission device 1 according to a first embodiment of the present invention.

FIG. 1 is a block diagram illustrating a functional structure of a data transmission device 1 according to a first embodiment of the present invention. In FIG. 1, the data transmission device 1 comprises an MPEG2-TS encoding unit 100, a time stamp addition unit 101, a clock generation unit 102, a timer unit 103, a communication protocol processing unit 104, and a communication unit 105.

The MPEG2-TS encoding unit 100 converts inputted video and/or audio signals to MPEG2-TS packets and outputs a resultant. FIG. 2A is a diagram illustrating a data structure of a plurality of MPEG2-TS packets outputted from the MPEG2-TS encoding unit 100. As shown in FIG. 2A, a plurality of MPEG2-TS packets 200 are outputted from the MPEG2-TS encoding unit 100.

The clock generation unit 102 generates and outputs an independent clock. The clock generated by the clock generation unit 102 has sufficient resolution, satisfying a PCR jitter tolerance of 25 microsecond or less, specified in ISO/IEC13818 Part 9 (MPEG2 Extension for real time interface). As a clock, a system clock (STC: System Time Clock) in the MPEG2-TS encoding unit 100 may be used.

The timer 103 counts on the clock generated by the clock generation unit 102 (referring to "counting a number of pulses", which is applied hereinafter) and outputs a counting result as time information. As the time information, current time may be used and a current count may be used. As the time information, whatever information regarding time may be used, not being limited to the aforementioned examples.

When an MPEG2-TS packet is inputted from the MPEG2-TS encoding unit 100, the time stamp addition unit 101 obtains from the timer unit 103 time information, which is first time information, at a time point of inputting the MPEG2-TS packet, adds a time stamp containing the first time information, and outputs the MPEG2-TS packet with the time stamp added therein. As described above, the first time information is information regarding time at a time of generating a packet.

Figure 2B:
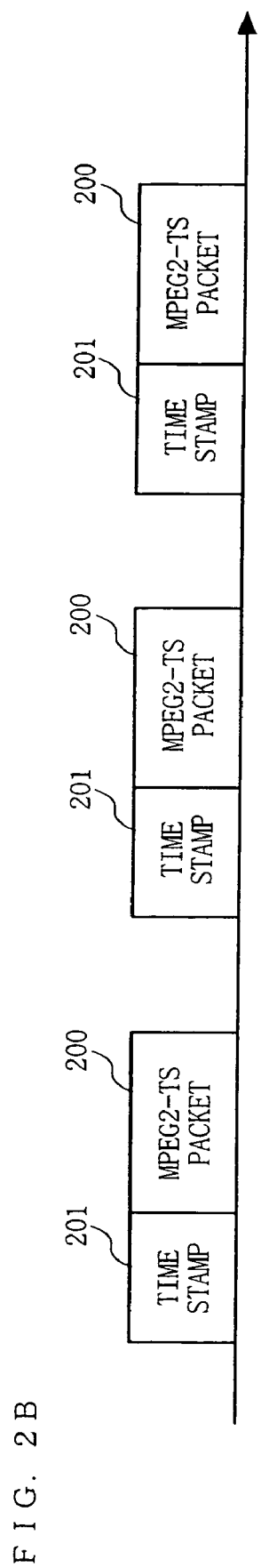
FIG. 2B is a diagram illustrating a data structure of a plurality of MPEG2-TS packets 200 to which time stamps 201 outputted by a time stamp addition unit 101 are added.

FIG. 2B is a diagram illustrating a data structure of a plurality of MPEG2-TS packets 200 to which time stamps outputted from the time stamp addition unit 101 have been added. As shown in FIG. 2B, the plurality of MPEG2-TS with the time stamps 201 added therein are outputted from the time stamp addition unit 101.

On the data transmission device 1 according to the first embodiment, a time axis with reference to time information outputted from the timer unit 103 is assumed. As described above, the time information of timing at which the MPEG2-TS encoding unit 100 outputs an MPEG2-TS packet is added to the MPEG2-TS packet as a time stamp. Therefore, with reference to the timing at which the MPEG2-TS encoding unit 100 outputs the MPEG2-TS packet, the time information outputted by the timer unit 103 is added to the MPEG2-TS packets as the first time information.

The communication protocol processing unit 104 combines the plurality of the MPEG2-TS packets to which the time stamps outputted from the time stamp addition unit 101 have been added, IP-packetizes and inputs resultants to the communication unit 105.

FIG. 3 is a diagram illustrating an example of a data structure of a data packet 2 (IPpacket) which has been IP-packetized by the communication protocol processing unit 104. In FIG. 3, the example in which RTP (Realtime Transport Protocol) is used as a communication protocol is shown. The MPEG2-TS packet 200 to which the time stamp 201 inputted to the communication protocol processing unit 104 has been added is rendered to be a data block 211. Other MPEG2-TS packets 200 to which time stamps inputted to the communication protocol processing unit 104 have been added are rendered to be data blocks 212 to 21N respectively. Transmitting a plurality of data blocks 211 to 21N in a collective manner is aimed at reducing redundancy in communication. Added to the plurality of data blocks 211 to 21N is copyright information 221. The copyright information 221 is used when MPEG2-TS packets are encrypted for a purpose such as copyright protection, and is, for example, information regarding permission for copying, encryption or the like. For example, the copyright information 221 is a header for DTCP-IP specified by DTCP (Digital Transmission Content Protection). Further, an RTP header 222, a UDP header 223, and an IP header 224 are added to the plurality of data blocks 211 to 21N. In the RTP header, there is a region for storing a time stamp. When transmitting MPEG2-TS packets by using RTP, it may be required for a value of PCR (Program Clock Reference) in the RTP header in the MPEG2-TS packet and a value of a time stamp in the RTP header to match. In the present invention, however, since a time stamp in the RTP header is not used, it is not required for the value of PCR (Program Clock Reference) in the RTP header in the MPEG2-TS packet and the value of a time stamp in the RTP header to match.

Figure 4:
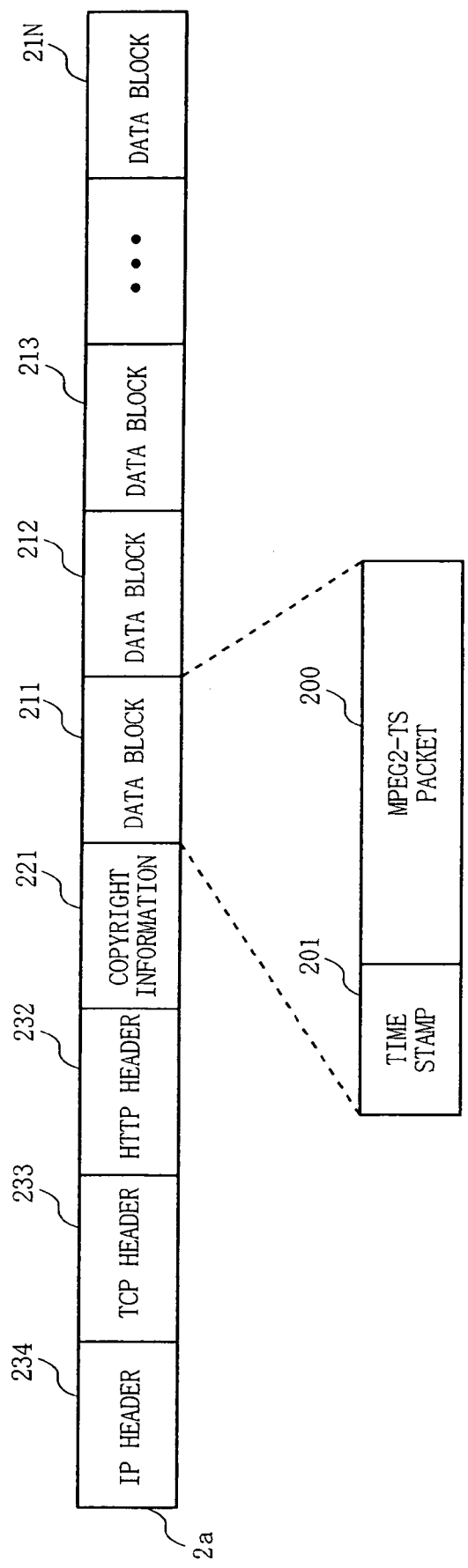
FIG. 4 is a diagram illustrating another example of a data structure of a data packet 2a (IP packet) IP-packetized by the communication protocol processing unit 104.

FIG. 4 is a diagram illustrating another example of a data structure of a data packet 2a (IP packet), which has been IP-packetized by the communication protocol processing unit 104. In FIG. 4, the example in which HTTP (HyperText Transfer Protocol) is used as a communication protocol is shown. Similarly to the example shown in FIG. 3, in which the RTP is used, an MPEG2-TS packet 200 to which the time stamp 201 inputted to the communication protocol processing unit 104 has been added is rendered to be a data block 211. And other MPEG2-TS packets 200, to which time stamps inputted to the communication protocol processing unit 104 have been added, are rendered to be data blocks 212 to 21N. Further, copyright information 221, an HTTP header 232, a TCP header 233, and an IP header 234 are added to a plurality of the data blocks 211 to 21N.

The larger the number of data blocks combined in the communication protocol processing unit 104, the less redundancy during transmission. Usually, when the transmission is performed by using an IP protocol, the communication protocol processing unit 104 sets a number of data blocks so that a total number of bytes of data contained in the IP header and the others, i.e., the UDP header 223, the RTP header 222, the copyright information 221, and the data blocks 211 to 21N in the example of FIG. 3, amounts to a number of bytes which is less than or equal to 1500 bytes but the largest number. And the communication protocol processing unit 104 sets a number of data blocks so that a total number of bytes of data contained the IP header 224 and the others, i.e., the TCP header 233, the HTTP header 232, the copyright information 221, and the data blocks 211 to 21N, amounts to a number of bytes which is less than or equal to 1500 but the largest number.

The communication protocol processing unit 104 performs IP packetization as shown in FIG. 3 and FIG. 4 and executes a predetermined communication protocol process.

Packets outputted from the communication protocol processing unit 104 are inputted to the communication unit 105. The communication unit 105 performs, for example, processes corresponding to those of a MAC layer and a physical layer in Ethernet (registered trademark) and outputs processed signals on a transmission line.

Figure 5:
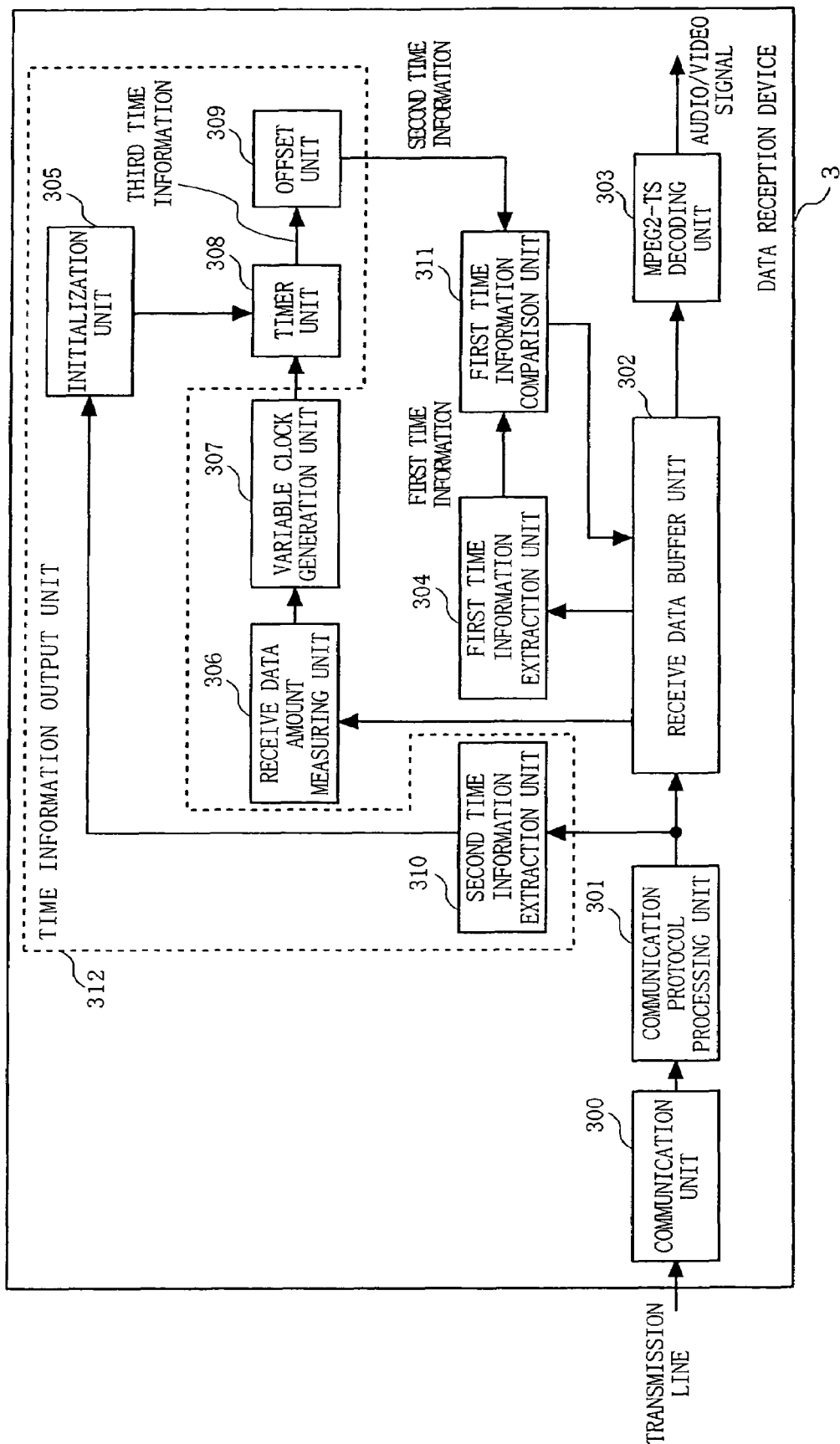
FIG. 5 is a block diagram illustrating a functional structure of a data reception device 3 according to the first embodiment of the present invention.

FIG. 5 is a block diagram illustrating a functional structure of a data reception device 3 according to the first embodiment of the present invention. In FIG. 5, the data reception device 3 comprises a communication unit 300, a communication protocol processing unit 301, a receive data buffer unit 302, an MPEG2-TS decoding unit 303, a first time information extraction unit 304, an initialization unit 305, a receive data amount measuring unit 306, a variable clock generation unit 307, a timer unit 308, an offset unit 309, a second time information extraction unit 310, and a first time information comparison unit 311. A time information output unit 312 comprises the initialization unit 305, the timer unit 308, the offset unit 309, and the second time information extraction unit 310.

Signals from the transmission line are inputted to the communication unit 300. The communication unit 300 performs processes corresponding to those of a MAC layer and a physical layer in the Ethernet (registered trademark) for inputted signals and inputs processed signals to the communication protocol processing 301.

The communication protocol 301 performs a predetermined communication protocol process, extracts data blocks contained in the received signals, and stores the extracted data blocks in the receive data buffer unit 302.

A plurality of data blocks are accumulated in the receive data buffer unit 302.

The receive data amount measuring unit 306 obtains an average value (hereinafter, referred to as an accumulated data average value) of total data amounts of the plurality of data blocks accumulated in the receive data buffer unit 302 and inputs to the variable clock generation 307 a control signal in accordance with an increase and a decrease in the obtained value, i.e., the accumulated data average value.

Based on the control signal from the receive data amount measuring unit 306, the variable clock generation unit 307 increases and decreases a frequency of a generated clock.

When the accumulated data average value increases, the receive data amount measuring unit 306 outputs a control signal so as to control the frequency of the clock generated by the variable clock generation unit 307. On the other hand, when the accumulated data average value decreases, the receive data amount measuring unit 306 outputs a signal so as to decrease the frequency of the clock generated by the variable clock generation unit 307. And when the accumulated data average value does not change, the receive data amount measuring unit 306 does not change the frequency of the clock generated by the variable clock generation unit 307.

By counting the clock generated by the variable clock generation unit 307, the timer unit 308 outputs second time information. As time information based on the count of the clock, current time may be used and a current total counted number may be used. Whatever information relates to time may be used, not being limited to the aforementioned examples.

The offset unit 309 subtracts a predetermined offset time from the time information outputted by the timer unit 308 so as to delay time shown by the time information outputted by the timer 308. Hereinafter, the time information outputted by the offset unit 309 is referred to as the second time information. The time delayed by the subtraction of the predetermined offset value is approximately a sum of transmission delay time and time required for buffering. The second time information is time information counted in accordance with a frequency of the clock generated by the variable clock generation unit 307. Time information generated by the timer unit 308 is third time information. The third time information is also time information counted in accordance with a frequency of the clock generated by the variable clock generation unit 307. A difference between the second time information and the third time information is that the second time information is delayed by a predetermined offset time.

Referring to the receive data buffer unit 302, the first time information extraction unit 304 extracts first time information in a time stamp associated with an MPEG2-TS packet to be outputted next, i.e., an MPEG2-TS packet accumulated at an oldest time point (accumulated the longest time ago) among the MPEG2-TS packets accumulated in the receive data buffer unit 302.

The first time information comparison unit 311 determines whether or not the first time information extracted by the first time information extraction unit 304 and the second time information outputted by the offset unit 309 coincide. While the second time information is being counted in an ever-changing manner, at a time point when the first time information extracted by the first time information extraction unit 304 and the second time information outputted by the offset unit 309 coincide, the first time information comparison unit 311 inputs to the receive data buffer unit 302 a control signal for instructing the receive data buffer unit 302 to output an MPEG2-TS packet.

When the control signal from the first time information comparison unit 311 has been inputted to the receive data buffer unit 302, the receive data buffer unit 302 extracts, among the accumulated MPEG2-TS packets, an MPEG2-TS packet in a data block accumulated at the oldest time point in terms of time and inputs the packet to the MPEG2-TS decoding unit 303.

After the MPEG2-TS packet has been outputted by the receive data buffer unit 302, first time information in a time stamp associated with a data block to be outputted next is extracted by the first time information extraction unit 304. The first time information extracted by the first time information extraction unit 304 is compared with second time information by the first time information comparison unit 311. At a time point when the first time information and the second time information coincide, the receive data buffer unit 302 outputs a next MPEG2-TS packet. Thus MPEG2-TS packets are outputted by the receive data buffer unit 302 in a sequential manner.

The MPEG2-TS decoding unit 303 converts data blocks, outputted by the receive data buffer unit 302, to video and/or audio signals and outputs the signals.

The second time information extraction unit 310 extracts a time stamp from a data block outputted by the communication protocol processing unit 301, extracts first time information from the extracted time stamp, and inputs the extracted first time information to the initialization unit 305.

As an initial setting, the initialization unit 305 causes third time information outputted by the timer unit 308 to coincide with the first time information.

Thus the time information which has been set in the timer unit 103 in the data transmission device 1 and the time information which has been set in the timer unit 308 in the data reception device 3 come to coincide if a delay on the transmission line is disregarded. Initialization in the initialization unit 305 is performed at an initial stage where data transmission and reception are performed between the data transmission device 1 and the data reception device 3. Thus when the initialization has been performed by the initialization unit 305, the time information which has been set in the timer unit 103 in the data transmission device 1 and the time information which has been set in the timer unit 308 in the data reception device 3 coincide if a delay on the transmission line is disregarded.

Figure 6:
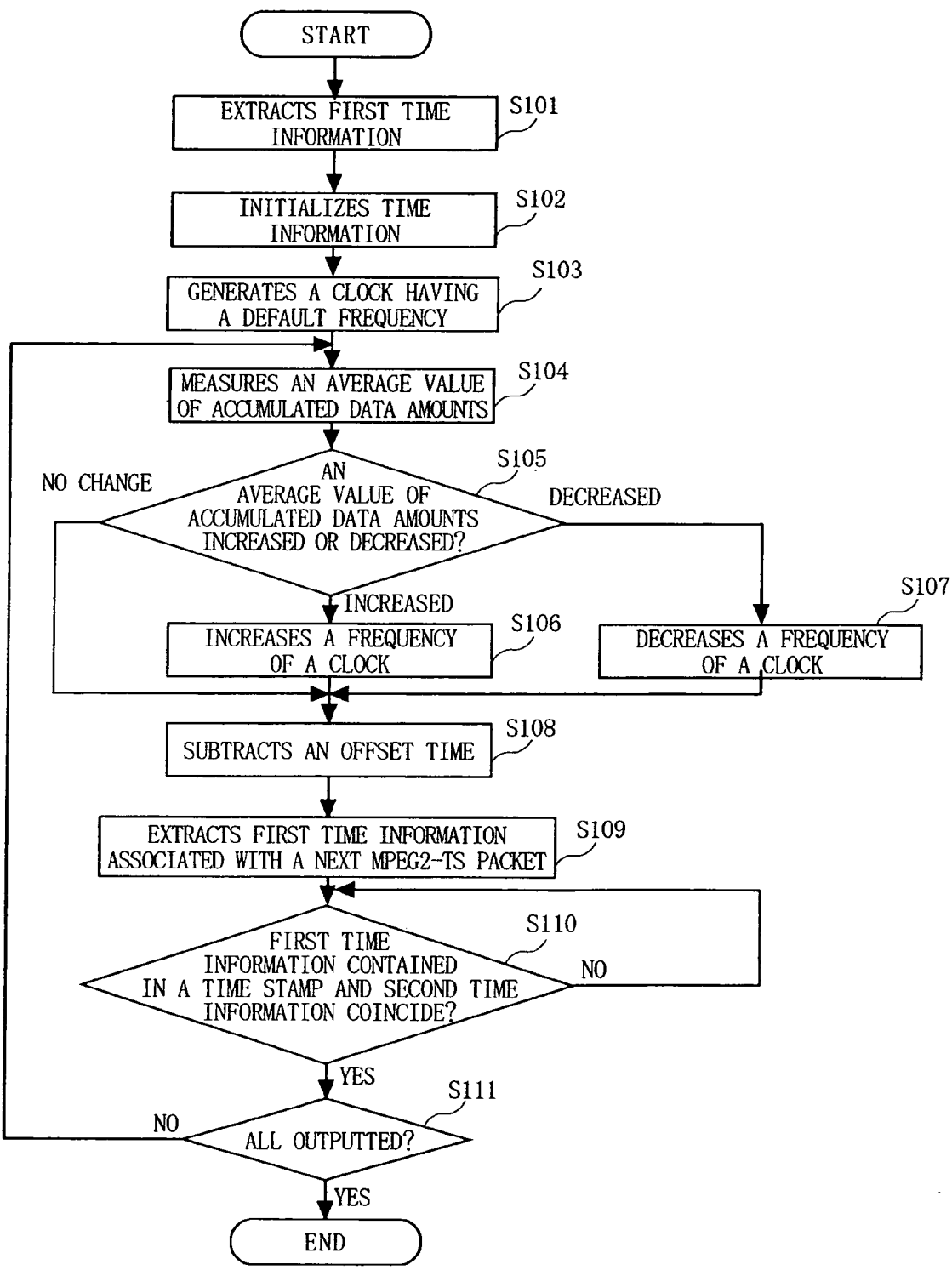
FIG. 6 is a flowchart showing a flow of operations performed by the data reception device 3.

FIG. 6 is a flowchart showing a flow of operations performed by the data reception device 3. Hereinafter, with reference to FIG. 6, the flow of operations performed by the data reception device 3 will be described.

When starting receiving an IP packet, i.e., a data packet, the second time information extraction unit 310 extracts first time information contained in the received IP packet (step S101). Next, the initialization unit 305, by causing third time information outputted by the timer unit 308 to coincide with the first time information extracted by the second time information, performs initialization (step S102).

Next, the variable clock generation unit 307 generates a clock having a default frequency (step S103). The default frequency approximately matches with a frequency of a clock generated by the clock generation unit 102 in the data transmission device 1. However, there are many cases where these two frequencies do not completely match due to influence by error and differences in precision.

Next, referring to the reception data buffer unit 302, the receive data amount measuring unit 306 obtains an average value of accumulated data (step S104).

Next, the receive data amount measuring unit 306 determines whether the obtained average value of accumulated data has increased or decreased compared with a previously obtained average value of accumulated data, or whether there is no change (step S105). At step S104, when an average value of accumulated data is obtained for the first time, processes at steps S105, S106, and S107 are omitted.

When the average value of accumulated data has increased, the receive data amount measuring unit 306 controls the variable clock generation unit 307 so as to increase a frequency of a clock by a predetermined value or a value corresponding to the increased amount (step S106) and proceeds to an operation at step S108. On the other hand, when an average value of accumulated data has decreased, the receive data amount measuring unit 306 controls the variable clock generation unit 307 so as to decrease a frequency of a clock by a predetermined value or a value corresponding to the decreased amount (step S107) and proceeds to an operation at step S108. Thereby the frequency of the clock is changed and the third time information outputted by the timer unit 308 is advanced or delayed. And when the average value of accumulated data does not change, the data reception device 3 directly proceeds to an operation at step S108. Because no change in the average value of accumulated data indicates that a time interval between MPEG2-TS packets on the receiving side and a time interval between MPEG2-TS packets to be outputted coincide, it is not necessary to change the frequency of the clock.

At step S108, the offset unit 309 subtracts an offset time from the third time information outputted by the timer unit 308, delays the third time information outputted by the timer unit 308, and outputs second time information.

Next, the first time information extraction unit 304 extracts from the receive data buffer unit 302 first time information in a time stamp associated with an MPEG2-TS packet to be decoded next (step S109).

Next, the first time information comparison unit 311 determines whether or not the first time information extracted by the first time information extraction unit 304 and the second time information coincide (step S110). When the first time information extracted by the first time information extraction unit 304 and the second time information coincide, the first time information comparison 311 outputs to the receive data buffer unit 302 an MPEG2-TS packet in accordance with the first time information and proceeds to an operation at step S111. On the other hand, when the first time information extracted by the first time information extraction unit 304 and the second time information do not coincide, the first time information comparison unit 311 repeats an operation at step S110 until the first time information and the second time information coincide. If a processing time for obtaining an average value of accumulated data is shorter than a time interval between MPEG2-TS packets and it is determined at step S110 that the first time information and the second time information do not coincide, the data reception device 3 may return to an operation at step S104.

At step 111, the first time information comparison unit 311 determines whether or not all MPEG2-TS packets contained in an IP packet currently transmitted have been outputted to the receive data buffer unit 302. When all the MPEG2-TS packets contained in the IP packet have not been outputted, the data reception device 3 returns to an operation at step S104. On the other hand, when all the MPEG2-TS packets contained in the IP packet have been outputted to the receive data buffer unit 302, the data reception device 3 ends the process.

As is seen in the above described processes, while receiving one IP packet, a closed-loop is formed by the variable clock generation unit 307, the timer unit 308, the offset unit 309, the first time information comparison unit 311, the first time information extraction unit 304, the receive data buffer unit 302, and the receive data amount measuring unit 306 form a closed-loop.

Next, a reason why the data reception device 3 according to the first embodiment is capable of reproducing an interval between MPEG2-TS packets on a transmitting side will be described.

First, as an ideal circumstance, a circumstance satisfying the following conditions will be considered:

(1) A frequency of a clock outputted by the clock generation unit 102 in the data transmission device 1 and a frequency of a default clock outputted by the variable clock generation unit 307 in the data reception device 3 completely match.

(2) A delay occurring on a transmission line is always constant.

(3) An offset time in the offset unit 309 has been set to an appropriate value in consideration of a delay occurring on the transmission line and a gap on a time axis, which occurs when MPEG2-TS packets are combined.

First time information in a time stamp associated with a first MPEG2-TS packet is set as an initial value. Accordingly, in a case of the ideal circumstance described above, since the above condition (1) is satisfied, time information in the timer unit 103 in the data transmission device 1 and third time information in the timer unit 308 in the data reception device 3 can synchronize. Further, since the above condition (3) is satisfied, the second time information outputted by the offset unit 309 is not ahead time information in a time stamp associated with an MPEG2-TS stored in the receive data buffer unit 302. Accordingly, in the case of the ideal circumstance described above, without changing a frequency of a clock outputted by the variable clock generation unit 307, the first time information comparison unit 311 can output MPEG2-TS packets stored in the receive data buffer unit 302 at same intervals as those between MPEG2-TS packets encoded by the data transmission device 1.

In an actual circumstance, however, the ideal conditions (1) and (2) described above are not satisfied. Therefore, only performing initialization by means of the initialization unit 305 fails to cause time intervals between MPEG2-TS packets to be outputted and those between MPEG2-TS packets on the transmitting side to coincide. Consequently, in the first embodiment, by changing a frequency of a clock based on an average value of accumulated data in the receive data buffer unit 302, coincidence of the time intervals between the outputted MPEG2-TS packets and those between the MPEG2-TS packets on the transmitting side is realized. Hereinafter, a reason why the time intervals between the outputted MPEG2-TS packets and those between the MPEG2-TS packets coincide will be described.

A case where the above condition (1) is not satisfied, i.e., a case where a frequency of a clock outputted by the clock generation unit 102 does not completely match with a default frequency of a clock outputted by the variable clock generation unit 307 in the data reception unit 3 will be considered.

For example, if the frequency of the clock outputted by the variable clock generation unit 307 is lower than a frequency of a clock outputted by the clock generation unit 102, the time intervals between MPEG2-TS packets outputted by the receive data buffer unit 302 become longer than the time intervals between MPEG2-TS with time stamps added on a transmitting side. In such a case, because a number of MPEG2-TS packets which are not outputted and remain stored in the receive data buffer unit 302 increases, an average value of accumulated data increases. If the average value of accumulated data increases, the frequency of the clock outputted by the variable clock generation unit 307 increases. If the frequency of the clock increases, third time information outputted by the timer unit 308 is advanced and second time information outputted by the offset unit 309 is advanced. If the second time information is advanced, comparison processing of time information by means of the first time information comparison unit 311 is facilitated, thereby making time intervals between outputted MPEG2-TS packets shorter and closer to time intervals between MPEG2-TS packets with time stamps added on the transmitting side. By means of the closed-loop for controlling a clock frequency, the time intervals between the outputted MPEG2-TS packets converge into a given value and coincide with the time intervals between MPEG2-TS packets with the time stamps added on the transmitting side.

Conversely, if a frequency of a clock outputted by the variable clock generation unit 307 is higher than a frequency of a clock outputted by the clock generation unit 102, time intervals between MPEG2-TS packets outputted by the receive data buffer unit 302 becomes shorter than time intervals between MPEG2-TS with time stamps with added on the transmitting side. In this case, because MPEG2-TS packets stored in the receive data buffer unit 302 are gradually decreasing, the average value of accumulated data decreases. If the average value of accumulated data decreases, a frequency of a clock outputted by the variable clock generation unit 307 is lowered. If the frequency of the clock is lowered, third time information outputted by the timer unit 308 is delayed and second time information outputted by the offset unit 309 is delayed. If the second time information is delayed, comparison processing of time information, performed by the first time information comparison unit 311, slowly proceeds, thereby making time intervals between MPEG2-TS packets longer and closer to the time intervals between MPEG2-TS packets with time stamps added on the transmitting side. By the closed-loop for controlling the clock frequency, the time intervals between the outputted MPEG2-TS packets converge into a given value and coincide with the time intervals between MPEG2-TS with the time stamps added on the transmitting side.

Next, a case where the above condition (2) is not satisfied, i.e., a case where a delay occurring on the transmission line is changing will be considered.

For example, if the delay on the transmission line increases, MPEG2-TS packets stored in the receive data buffer unit 302 are outputted one after another and thereby the average value of accumulated data decreases. If despite the decreasing trend of the average value of accumulated data, processing is continued without lowering a frequency of a clock, the second time information precedes the first time information associated with MPEG2-TS packets stored in the receive data buffer unit 302. As a result, MPEG2-TS packets to be outputted are depleted. Therefore, if the average value data of accumulated data decreases, the receive data amount measuring unit 306 lowers a frequency of a clock outputted by the variable clock generation unit 307. Thereby the second time information is delayed, preventing the second time information from being ahead. As a result, depletion of MPEG2-TS packets to be outputted in the receive data buffer unit 302 can be avoided. In this case, time intervals between the MPEG2-TS packets to be outputted become longer. Conversely, if the delay on the transmission line decreases, the MPEG2-TS packets are gradually accumulated in the receive data buffer unit 302 and the average value of accumulated data increases. If the average value of accumulated data increases, the frequency of the clock is raised and thereby the second time information is advanced, facilitating the comparison processing of the time information in the first time information comparison unit 311. As a result, the time intervals between the MPEG2-TS packets to be outputted become shorter. Therefore, even when fluctuation in the delay on the transmission line arises, the time intervals between MPEG2-TS packets outputted from the data reception device 3, on average, coincide with the time intervals between MPEG2-TS packets with time stamps added on the transmitting side.

In an actual circumstance, the conditions (1) and (2) intertwine in a complex manner. However, because the data reception device 3 controls a frequency of a clock outputted by the variable clock generation unit 307 by using an average value of accumulated data, the time intervals between the MPEG2-TS packets outputted by the data reception device 3, on average, coincide with the time intervals between MPEG2-TS packets with time stamps added on the transmitting side.

Next, a reason why an average value of data accumulated in the receive data buffer unit 302 is used to control a frequency of a clock will be described.

There are cases where time intervals between MPEG2-TS packets outputted by the MPEG2-TS encoding unit 100 of the data transmission device 1 may be regular or irregular. If the intervals between the packets are irregular, a data amount accumulated in the receive data buffer unit 302 fluctuates. As an encoding method in MPEG, there is a constant bit rate (CBR) where a constant amount of codes are generated and there is a variable bit rate (VBR) where an amount of generated codes change. In a case where VBR is used, an amount of data accumulated in the receive data buffer unit 302 changes. Even when an encoding method in which the intervals between the packets are irregular is used, an average of the intervals between the packets per unit of time is constant. And when the VBR is used, an average amount of accumulated data is constant. Therefore, even if an amount of accumulated data changes for a short period of time, an average of data accumulated in the receive data buffer unit 302 per unit of time is constant.

Accordingly, by controlling a frequency of a clock in accordance with an average value of accumulated data, the frequency of the clock and a frequency of a clock on the transmitting side can, on average, match. Thus the time intervals between the MPEG2-TS packets outputted by the data reception device 3 and the time intervals between MPEG2-TS with the time stamps added on the transmitting side coincide.

In the receive data amount measuring unit 306, although here, a frequency of a clock is controlled in accordance with an average value of accumulated data amounts, the frequency of the clock may be controlled in accordance with an instantaneous amount of accumulated data in the receive data buffer unit 302. In this case, however, the receive data amount measuring unit 306 controls a frequency of a clock so that time required to change the frequency of the clock becomes sufficiently longer than time required for an instantaneous change in a data amount accumulated in the receive data buffer unit 302.

Addition of a predetermined offset time to the third time information of the timer unit 308 by means of the offset unit 309 is to consider a delay on the transmission line. As described above, if the delay on the transmission line is disregarded, time information of the timer unit 103 in the data transmission device 1 and the third time information of the timer unit in the data reception device 3 coincide. Actually, however, because the delay arises on the transmission line, MPEG2-TS packets sometimes do not arrive at the time indicated by the third time information of the timer unit 308 in the data reception device 3. Adding the offset time can delay output timing for MPEG2-TS packets to be outputted by the receive data buffer unit 302. Therefore, a situation where due to the delay on the transmission line, time indicated by the first time information contained in the time stamp has passed at the data reception device 3 and the MPEG2-TS packets are not decoded can be avoided. The shorter the delay time in outputting the MPEG2-TS packets, the more preferable. However, an excessively short delay may cause a situation where data to be outputted do not arrive at the receiving side, resulting in depletion of data to be outputted. With the above described consideration, the offset time should be appropriately set.

For example, the delay of data to be transmitted may become great depending on conditions of the transmission line. For example, when data are transmitted via a wide-area network by using Ethernet (registered trademark) or the like, fluctuation in the delay of data becomes great. And when data is transmitted via a wireless LAN in IEEE802.11, if a transmission error occurs, data retransmission in a MAC layer arises. If the data retransmission arises, the delay in the data transmission becomes great. If the delay in the data transmission is great, data to be accumulated in the receive data buffer unit 302 does not arrive and there may remain no data to be outputted at a required time. However, if a predetermined offset time is added by the offset unit 309, this kind of situation can be avoided. If conditions of the transmission line deteriorate and a delay in data transmission is great, an addition of an offset time can delay time, on a time axis, indicated by second time information which is used for comparison in the first time information comparison unit 311 and data accumulated for a predetermined time are accumulated in the receive data buffer unit 302. As a result, a situation where data are depleted can be avoided.

The offset unit 309 may change the predetermined offset time in accordance with a data amount accumulated in the receive data buffer unit 302. Specifically, the offset unit 309 may control the predetermined offset time so that the predetermined offset time decreases when a large data amount is accumulated in the receive data buffer unit 302 and the predetermined offset time increases when a small data amount is accumulated in the receive data buffer unit 302. Thereby while the data amount retained in the receive data buffer unit 302 is kept to a minimum, the receive data is controlled so as not to be depleted. However, the offset time has to be controlled without exerting any effect on a closed-loop control which is performed by the receive data amount measuring unit 306.

A delay amount in transmission fluctuates depending on a kind of a physical layer, a MAC layer, or the like, of a communication protocol, used for the transmission. Therefore, even when the predetermined offset time is changed in accordance with the kind of a communication protocol, a data amount retained in the receive data buffer unit 302 can be optimized.

Also the offset unit 309 may change a predetermined offset time in accordance with conditions of the transmission line. In a case of a wireless LAN, for example, if there is a transmission line error, data retransmission is performed. By counting a number of times at which data transmission is performed, the conditions of the transmission line can be grasped. When the retransmission is performed at many times and thereby a delay in transmission increases, the offset unit 309 increases the offset time.

Needless to say, in the first embodiment, operations of respective functional blocks shown in FIG. 5 may be performed in a parallel manner.

In the method of the first embodiment, in which a frequency of a clock is controlled by measuring a buffer amount, when beginning to receive IP packets, i.e., until a data amount equal to or more than a predetermined amount has been accumulated in the receive data buffer unit 302, a feedback based on the buffer amount is not obtained and thereby an open-loop is formed, which may lead to a malfunction. Therefore, during a predetermined period from a time point of beginning to receive the IP packets, the receive data amount measuring unit 306 may fix to a default value a frequency of a clock outputted by the variable clock generation unit 307. This can avoid the malfunction caused by the open-loop. In other words, the receive data amount measuring unit 306 may begin to control a frequency of a clock after a predetermined time has passed.

Second Embodiment

In a second embodiment of the present invention, since a structure of a data transmission device and a structure of an IP packet including MPEG2-TS packets are similar to those in the first embodiment, FIG. 1 to FIG. 4 are utilized.

Figure 7:
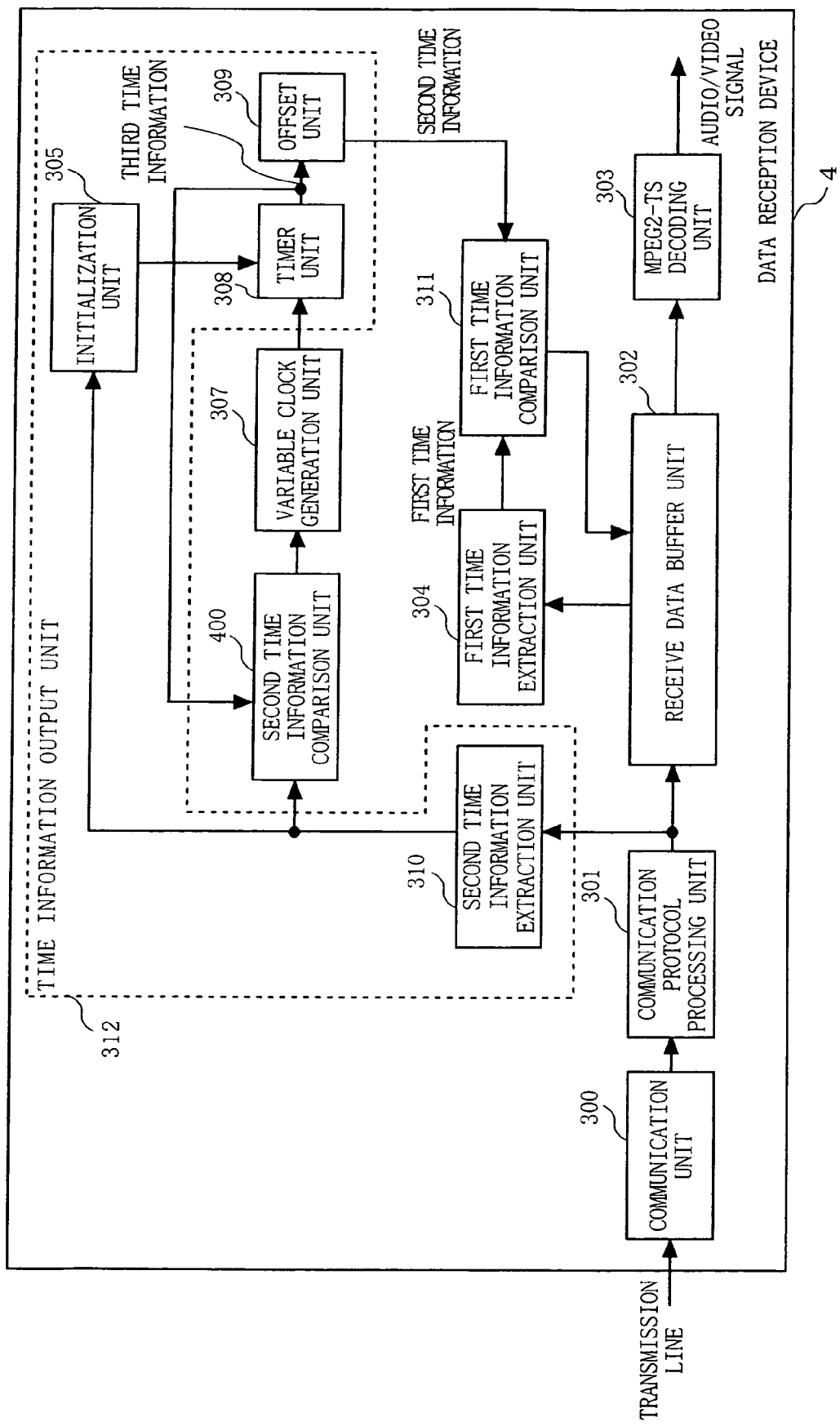
FIG. 7 is a block diagram illustrating a functional structure of a data reception device 4 according to a second embodiment of the present invention.

FIG. 7 is a block diagram illustrating a functional structure of a data reception device 4 according to the second embodiment. Parts in FIG. 7, which have same functions as in the data reception device 3, are marked with same reference numerals as those in the data reception device 3 and descriptions in detail will be omitted.

In FIG. 7, the data reception device 4 comprises a communication unit 300, a communication protocol processing unit 301, a receive data buffer unit 302, an MPEG2-TS decoding unit 303, a first time information extraction unit 304, an initialization unit 305, a variable clock generation unit 307, a timer unit 308, an offset unit 309, a second time information extraction unit 310, a first time information comparison unit 311, and a second time information comparison unit 400.

As shown in FIG. 7, the data reception device 4 in the second embodiment is equipped with the second time information comparison unit 400, instead of the receive data amount measuring unit 306 in the first embodiment.

The second time information extraction unit 310 extracts a time stamp outputted by the communication protocol processing unit 301 and first time information contained in the time stamp, and inputs the first time information to the initialization unit 305 and to the second time information comparison unit 400.

The second time information comparison unit 400 compares the first time information extracted by the second time information extraction unit 310 and third time information outputted by the timer unit 308, and inputs, to the variable clock generation unit 307, a control signal in accordance with a time difference. The variable clock generation unit 307 increases or decreases a frequency of a clock to be generated in accordance with the control signal inputted by the second time information comparison unit 400. When the first time information extracted by the second time information extraction unit 310 is behind the third time information outputted by the timer unit 308, the second time information comparison unit 400 outputs a control signal so as to increase a frequency of a clock generated by the variable clock generation unit 307. On the other hand, when the first time information extracted by the second time information extraction unit 310 is ahead the third time information outputted by the timer unit 308, the second time information comparison unit 400 outputs a control signal so as to decrease a frequency of a clock generated by the variable clock generation unit 307. When the first time information extracted by the second time information extraction unit 310 coincides with the third time information outputted by the timer unit 308, the second time information comparison unit 400 does not change a frequency of a clock generated by the variable clock generation unit 307.

Figure 8:
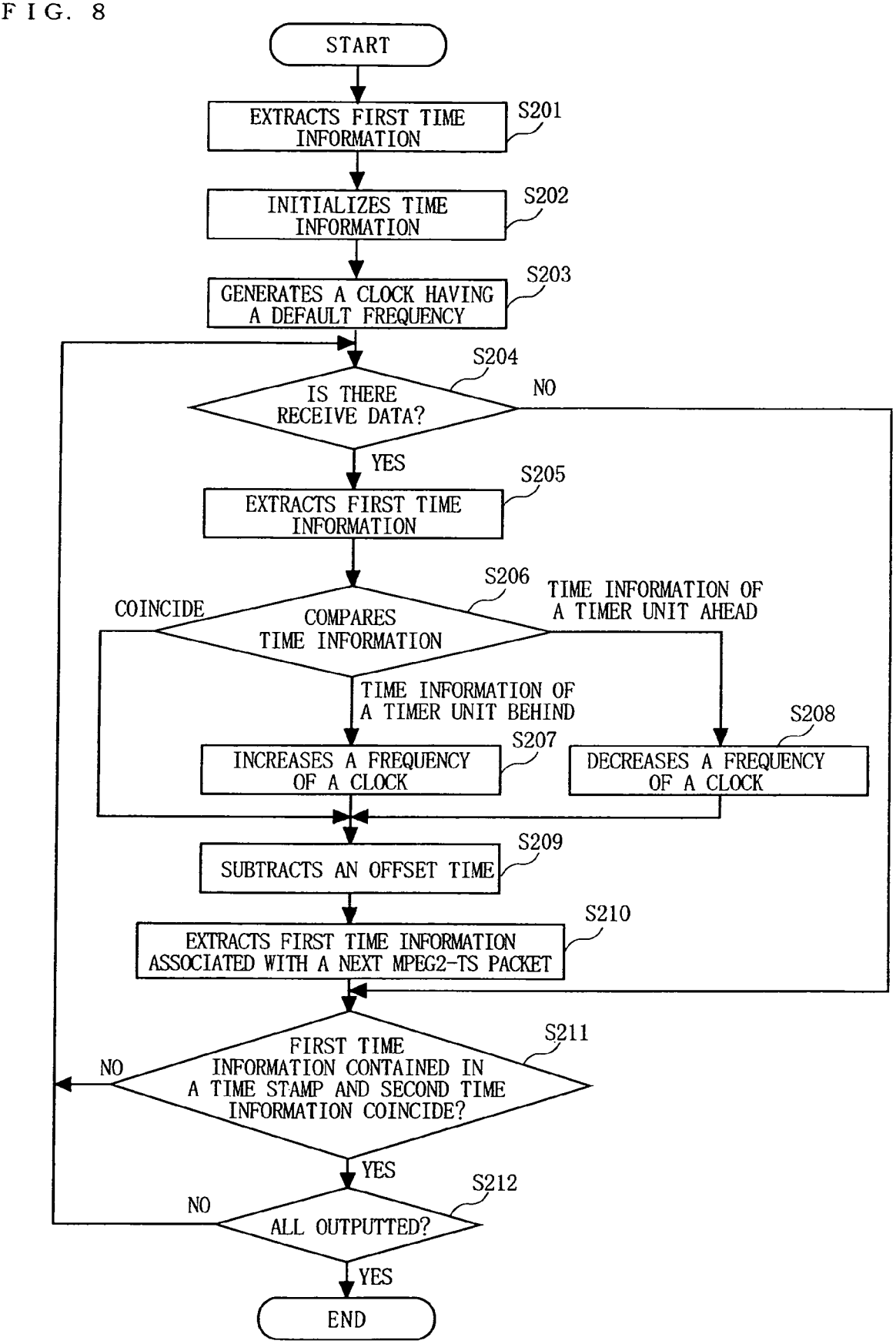
FIG. 8 is a flowchart showing operations performed by the data reception device 4 according to the second embodiment of the present invention.

FIG. 8 is a flowchart showing operations by the data reception device 4 according to the second embodiment. Hereinafter, with reference to FIG. 8, the operations by the data reception device 4 according to the second embodiment will be described.

When an IP packet reception starts, the second time information extraction unit 310 extracts first time information in a timestamp contained in a data block of a received IP packet. (step S201).

Next, the initialization unit 305 causes the third time information outputted by the timer unit 308 and the first time information extracted by the second time information extraction unit 310 to coincide, performing initialization (step S202).

Next, the variable clock generation unit 307 generates a clock having a default frequency (step S203).

Next, the data reception device 4 determines whether or not there is data received by the communication protocol processing unit 300 (step S204). When the data does not exist, the data reception device 4 proceeds to step S211. On the other hand, when the data exist, the data reception device 4 proceeds to step S205.

At step S205, the second time information extraction unit 310 extracts the first time information from the data received by the communication protocol processing unit 301.

Next, the second time information comparison unit 400 compares the third time information outputted by the timer unit 308 and the first time information extracted by the second time information extraction unit 310 at step S205 (step S205). When the third time information outputted by the timer unit 308 is behind, the second time information comparison unit 400 controls the variable clock generation unit 307 so as to increase a frequency of the clock (step S207) and proceeds to step S209. On the other hand, when the third time information outputted by the timer unit 308 is ahead, the second time information comparison unit 400 controls the variable clock generation unit 307 so as to decrease a frequency of the clock (step S208) and proceeds to step S209. And when the first time information and the third time information coincide, the second time information comparison unit 400, without changing a frequency of the clock, proceeds to an operation at step S209.

At step S209, the offset unit 309 subtracts an offset time from the third time information outputted by the timer unit 308, delays the third time information outputted by the timer unit 308, and outputs the second time information.

Next, the first time information extraction unit 304 extracts from the data buffer unit 302 a time stamp associated with an MPEG2-TS packet to be decoded next (step S210).

Next, the first time information comparison unit 311 determines whether or not first time information contained in the time stamp extracted by the first time information extraction unit 304 and the second time information coincide (step S211). When the first time information and the second time information coincide, the first time information comparison unit 311 outputs to the receive data buffer unit 302 an MPEG2-TS packet associated with the extracted first time information and proceeds to an operation at step S212. On the other hand, when the first time information and the second time information do not coincide, the firs time information comparison unit 311 returns to an operation at step S204.

At step S212, the first time information comparison unit 311 determines whether or not all MPEG2-TS packets contained in an IP packet transmitted this time have been outputted to the receive data buffer unit 302. When all the MPEG2-TS packets have not been outputted, the data reception device 4 returns to an operation at step S204. On the other hand, when all the MPEG2-TS packets have been outputted, the data reception device 4 ends the process.

As shown in the above process, the variable clock generation unit 307, the timer unit 308, and the second time information comparison unit 400 form a closed-loop.

Thus, the second time information comparison unit 400 compares the first time information extracted by the second time information extraction unit 310 with the third time information outputted by the timer unit 308 and controls a frequency of a clock outputted by the variable clock generation unit 307 in accordance with a time difference. When the third time information outputted by the timer unit 308 is behind the first time information associated with the received MPEG2-TS packets, which means a frequency of the clock is low, the second time information comparison unit 400 increases the frequency of the clock and thereby the frequency of the clock generated by the variable clock generation unit 307 is changed so as to match with a frequency of a clock generated by the clock generation unit 102 in the data transmission device 1 shown in FIG. 1. On the other hand, when the third time information outputted by the timer unit 308 is ahead the first time information associated with the received MPEG2-TS packets, which means a frequency of the clock is high, the second time information comparison unit 400 decreases the frequency of the clock and thereby the frequency of the clock generated by the variable clock generation unit 307 is changed so as to match with a frequency of a clock generated by the clock generation unit 102 in the data transmission device 1 shown in FIG. 1.

Accordingly, the third time information outputted by the timer unit 308 in the data reception device 4 and time information outputted by a timer unit 103 in the data transmission device 1 come to synchronize.

By causing the timer unit 103 in the data transmission device 1 and the timer unit 308 in the data reception device 4 to synchronize, time intervals between MPEG2-TS packets outputted by an MPEG2-TS encoding unit 100 in the data transmission device 1 and time intervals between MPEG2-TS packets to be inputted to an MPEG2-TS decoding unit 303 from the receive data buffer unit 302 come to coincide.

Here, the second time information comparison unit 400 controls a frequency of a clock so that time required to change the frequency of the clock becomes sufficiently longer than compared time. For example, the second time information comparison unit 400 calculates an average value of time differences per unit of time and based on the average, it is determined whether the third time information outputted by the timer unit 308 is ahead or behind (step S206), in order to control the clock (S207 and S208). In some cases, the data transmission device 1 may combine and IP-packetize MPEG2-TS packets such that a time gap from time indicated by time information contained in a time stamp accrues on a time axis. Therefore, at the moment the data reception device 4 receives an IP packet, the third time information outputted by the timer unit 308 and the first time information contained in the time stamp may not coincide. This may cause time differences not to be zero and lead to a great fluctuation in time differences. However, the time gap accruing when combining the MPEG2-TS packets is, on average, constant. Therefore, as described above, the second time information comparison unit 400 controls a frequency of a clock, thereby allowing the third time information outputted by the timer unit 308 in the data reception device 4 and the first time information outputted by the timer unit 103 in the data transmission device to coincide.

When an average value of time differences is calculated, in some case, a process at step S211 may be repeated until the first time information and the second time information coincide.

The second time information comparison unit 400 may not use all values in time stamps extracted by the second time information extraction unit 310 for obtaining time differences. For example, the second time information comparison unit 400 may compare the third time information outputted by the timer unit 308 with only the first time information contained in a data block 211, which is at an initial position among data blocks. And the second time information unit 400 may perform time information comparison regularly.

Third Embodiment

In a third embodiment of the present invention, since a structure of a data transmission device and a structure of an IP packet including MPEG2-TS packets are similar to those in the first embodiment, FIG. 1 to FIG. 4 are utilized.

Figure 9:
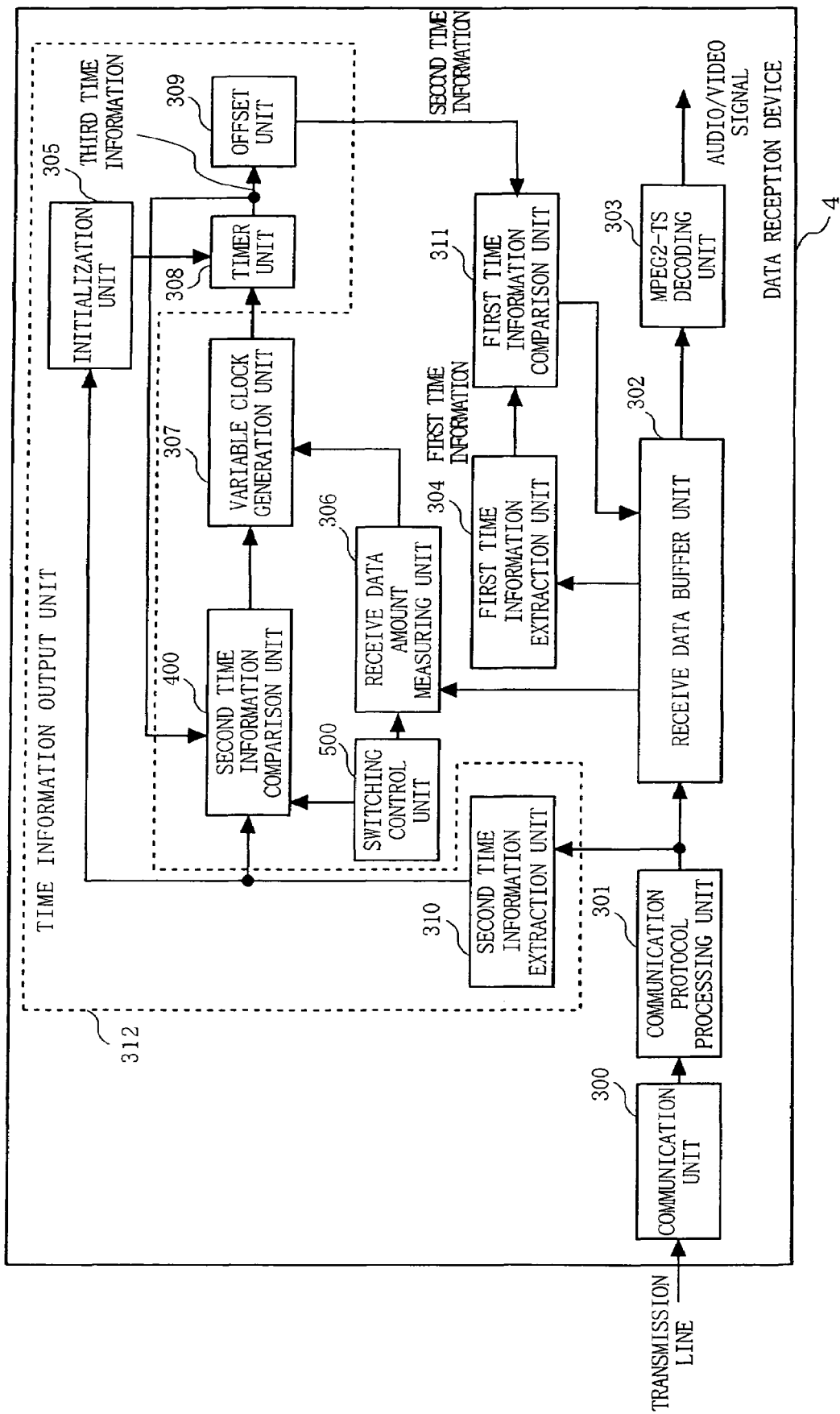
FIG. 9 is a block diagram illustrating a functional structure of a data reception device 5 according to a third embodiment of the present invention.

FIG. 9 is a block diagram illustrating a functional structure of a data reception device 5 according to the third embodiment. Parts in FIG. 9, which have same functions as in the data reception device 3 and the data reception device 4, are marked with same reference numerals as those in the data reception device 3 and the data reception device 4 and descriptions in detail will be omitted.

In FIG. 9, the data reception device 5 comprises a communication unit 300, a communication protocol processing unit 301, a receive data buffer unit 302, an MPEG2-TS decoding unit 303, a first time information extraction unit 304, an initialization unit 305, a receive data amount measuring unit 306, a buffering amount variable clock generation unit 307, a timer unit 308, an offset unit 309, a second time information extraction unit 310, a first time information comparison unit 311, a second time information comparison unit 400, and a switching control unit 500.

The switching control unit 500 causes the second time information comparison unit 400 to control a frequency of a clock for a predetermined period from a start of a data reception. After the predetermined period, the switching control unit 500 causes the receive data amount measuring unit 306 to control a frequency of the clock.

Figure 10:
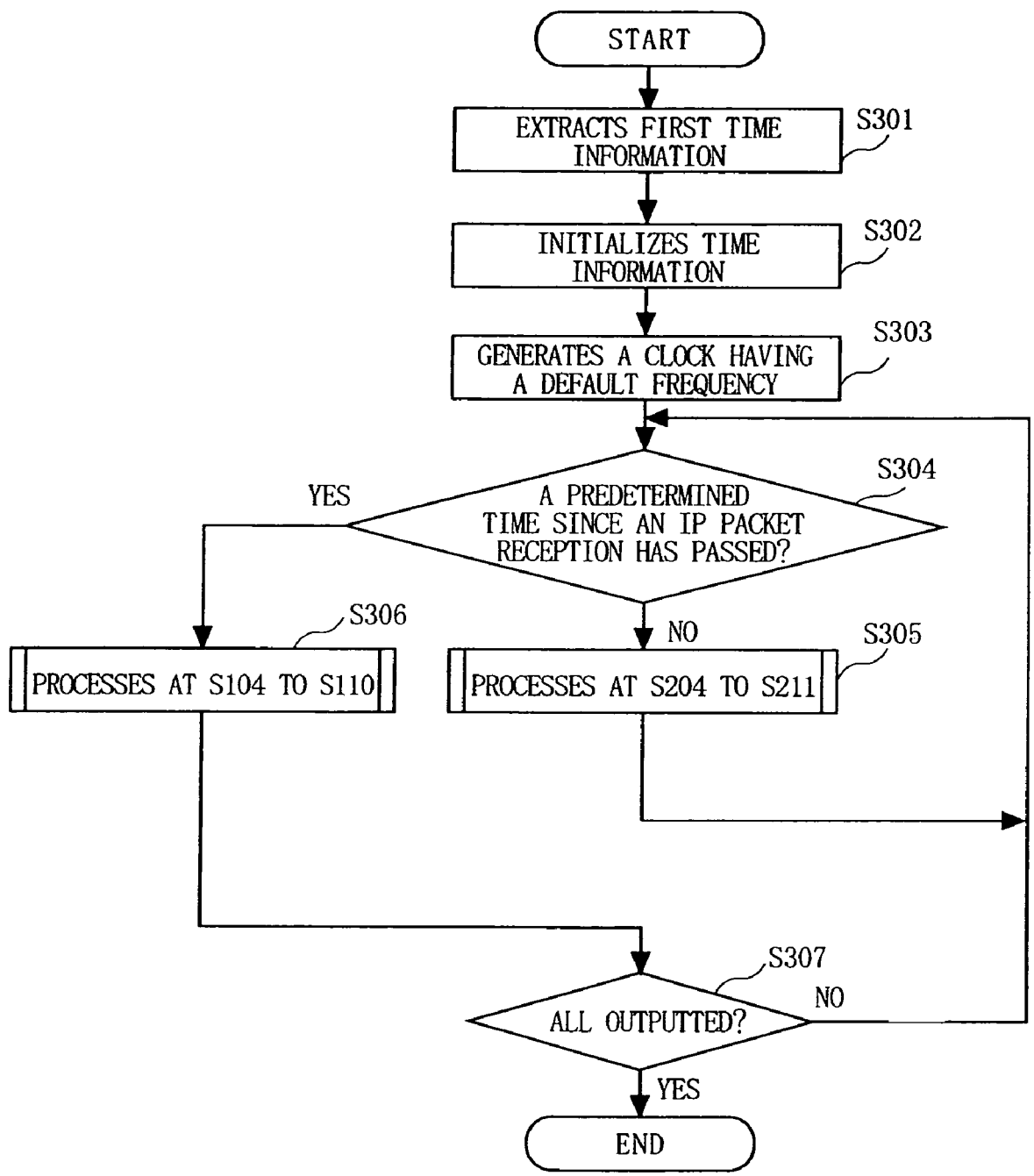
FIG. 10 is a flowchart showing operations performed by the data reception device 5 according to the third embodiment of the present invention.
Figure 11:
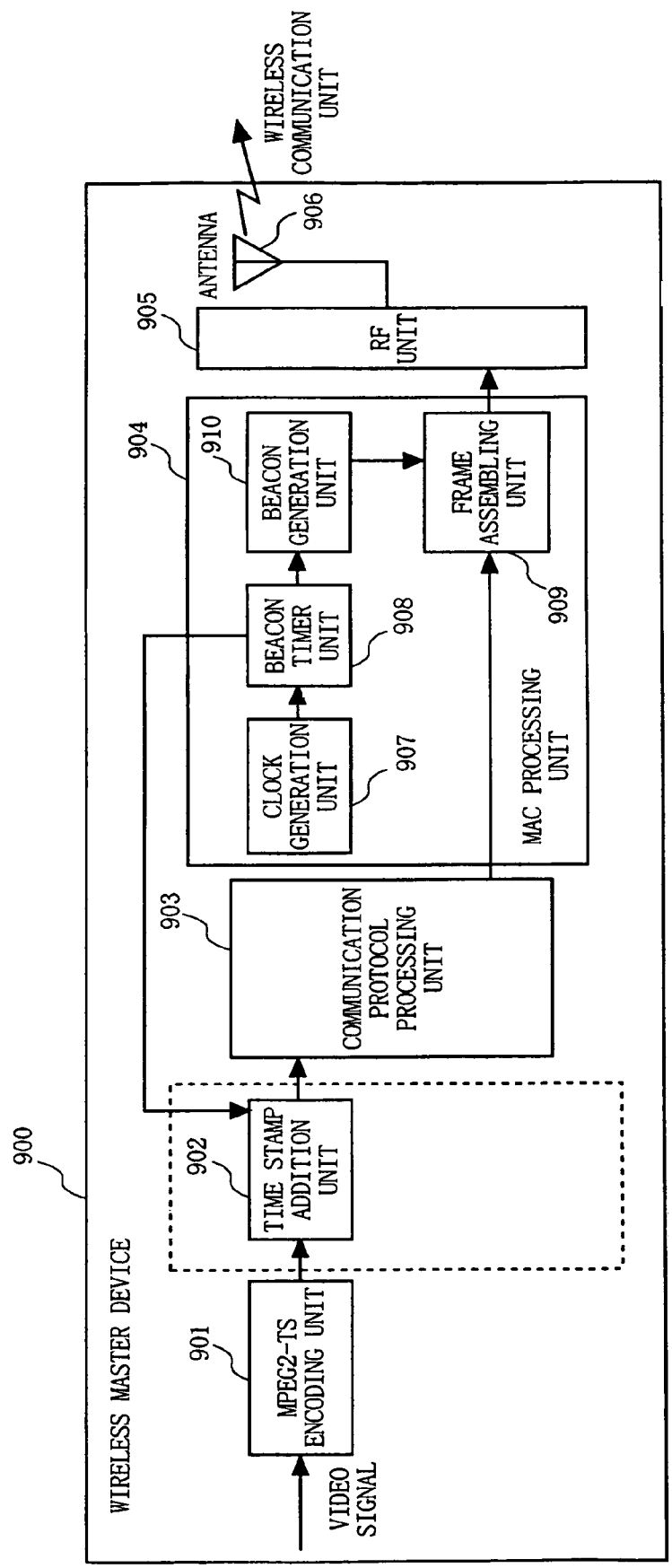
FIG. 11 is a block diagram illustrating a functional structure of a conventional wireless mater device 900 on a transmitting side, which is described in a patent document 1.
Figure 12:
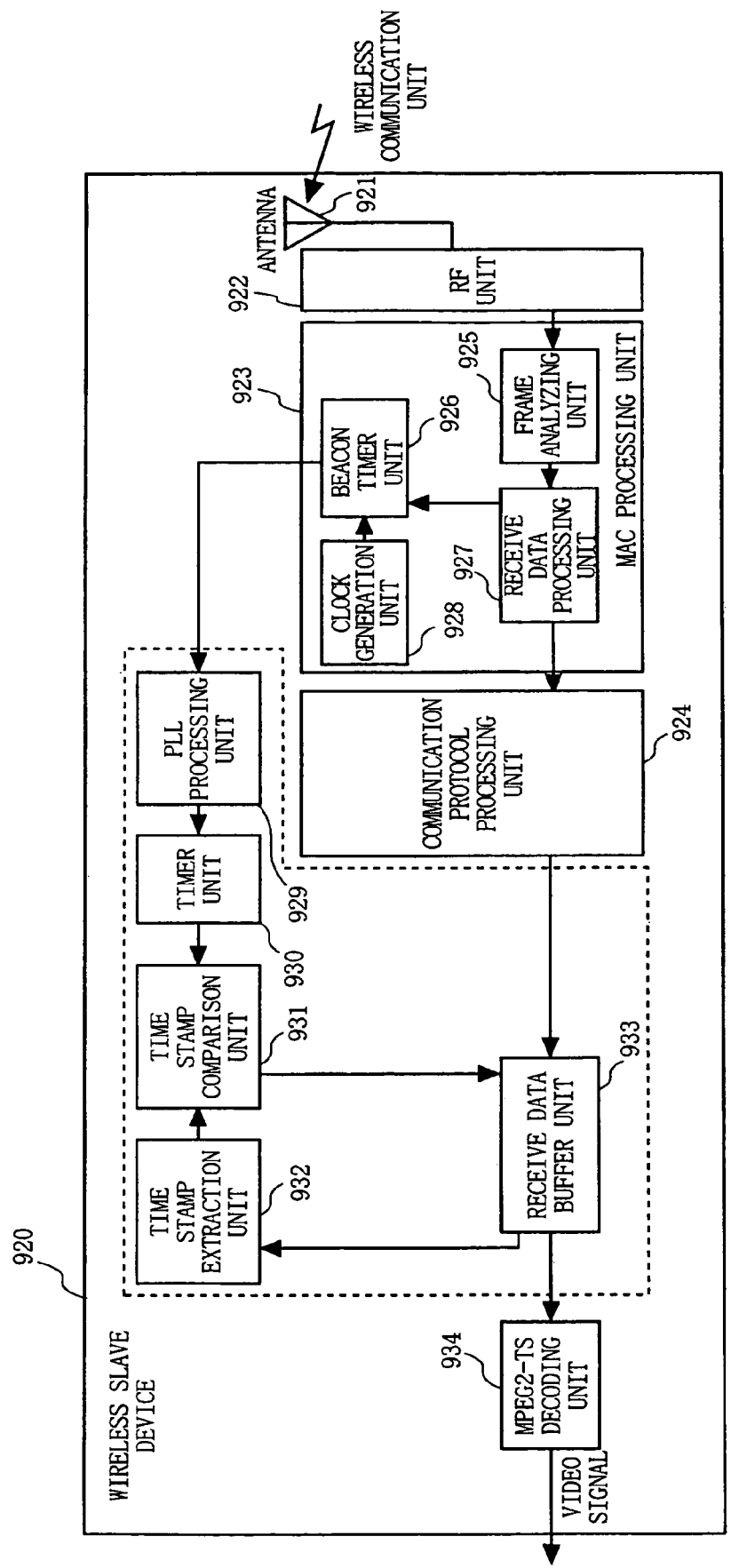
FIG. 12 is a block diagram illustrating a functional structure of a conventional wireless slave device 920 on a receiving side, which is described in a patent document 1.
Figure 13:
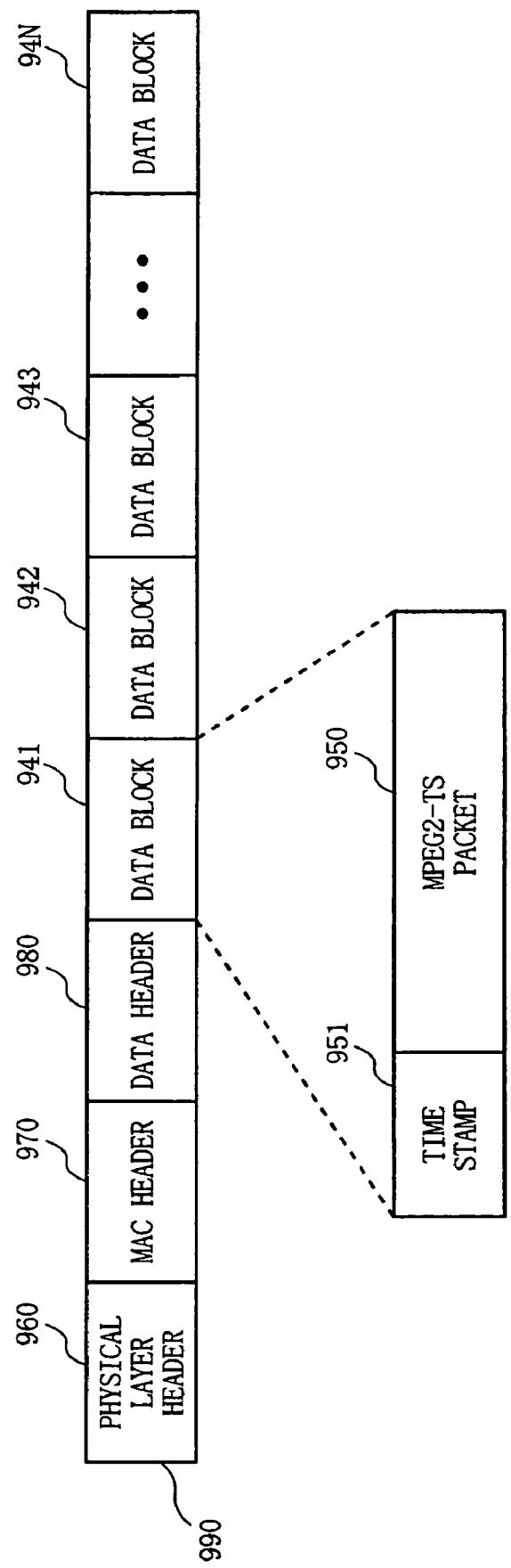
FIG. 13 is a diagram illustrating a frame structure of a data packet 990 transmitted from a conventional wireless mater station, which is described in a patent document 1.

FIG. 10 is a flowchart showing operations performed by the data reception device 5 according to the third embodiment. Hereinafter, with reference to FIG. 10, operations performed by the data reception device 5 according to the third embodiment will be described.

Upon starting an IP packet reception, the second time information extraction unit 310 extracts a time stamp contained in a data block in a received IP packet (step S301).

Next, the initialization unit 305 sets, to an initial setting value in the timer unit 308, time information contained in the time stamp extracted by the second time information extraction unit 310 (step S302).

Next, the variable clock generation unit 307 generates a clock having a default frequency (step S303).

Next, the switching control unit 500 determines whether or not a predetermined time has passed since the reception of the IP packet (or whether or not a predetermined or more amount of data has been accumulated in the receive data buffer unit 302) (S304) When the predetermined time has not passed (when the predetermined or more amount of data has not been accumulated), the data reception device 5 proceeds to an operation at step S305. On the other hand, when the predetermined time has passed (when the predetermined or more amount of data has been accumulated), the data reception device 5 proceeds to an operation at step S306.

At step S305, in order to control a frequency of a clock by means of the second time information comparison unit 400, the data reception device 5 executes processes similar to those performed at step 204 to 211 shown in FIG. 8. After finishing the process at step S305, the data reception device 5 returns to an operation at step S304.

At step S306, in order to control a frequency of a clock by means of the receive data amount measuring unit 306, the data reception device 5 executes processes similar to those performed at step S104 to S110 shown in FIG. 8. After finishing the process at step S306, the data reception device 5 proceeds to an operation at step S307.

At step S307, the first time information comparison unit 311 determines whether or not all MPEG2-TS packets contained in the IP packet transmitted this time has been outputted to the receive data buffer unit 302. When all MPEG2-TS packets contained in the IP packet transmitted this time has not been outputted, the data reception device 5 returned to an operation at step S304. On the other hand, when all MPEG2-TS packets contained in the IP packet transmitted this time has been outputted, the data reception device 5 ends the process.

As pointed out in the first embodiment, in the beginning of receiving the IP packet, an open-loop may cause a malfunction. However, as in the third embodiment, when starting a reception of the IP packet, the data reception device 5 is capable of controlling a frequency of a clock so as to match with a frequency of a clock on the transmitting side. After the predetermined time has passed (or after the predetermined amount of data has been accumulated), the data reception device 5 switches to feedback control through buffer amount measurement. In the third embodiment, the feedback control through the buffer amount measurement is effective because the frequencies of the clocks quickly match with each other. In addition, since the feedback control through the buffer amount measurement can feedback an integration value of changing data amounts, the feedback control through the buffer amount measurement allows more stable coincidence of the time intervals, under a normal operation, than the feedback control through time stamp extraction.

The data reception devices 3, 4, and 5 in the first, the second, and the third embodiments may be general-purpose computers. In this case, programs which cause central processing units to perform operations shown in FIG. 6, FIG. 8, or FIG. 10 may be stored in computer-readable storage media. And the programs are read into the central processing units. The central processing units into which the programs have been read cause the computers, i.e., data reception devices, to perform the operations shown in FIG. 6, FIG. 8, or FIG. 10.

Note that respective functional blocks as shown in FIG. 5, FIG. 7, and FIG. 9 may be realized as an LSI, which is an integrated circuit. These functional blocks may be constructed in a chip form, or may be constructed in a chip form so as to include a part or all of the functional blocks. Typically, the receive data buffer unit 302 is a storage device provided outside the integrated circuit. The LSI may be referred to as an IC, a system LSI, a super LSI, or an ultra LSI, etc., depending on the degree of integration. Also, the method of integration is not limited to LSI, and may be realized by a dedicated circuit or a general purpose processor. Also, an FPGA (Field Programmable Gate Array), which is an LSI that can be programmed after manufacture, or a reconfigurable processor enabling connections and settings of the circuit cells in the LSI to be reconfigured may be used. Further, in the case where another integration technology replacing LSI becomes available due to improvement of a semiconductor technology or due to the emergence of another technology derived therefrom, integration of the functional blocks may be performed using such a new integration technology. For example, biotechnology may be applied to the above-described integration.

Although in the first, the second, and the third embodiments, the communication unit 300 performs processes of the MAC layer and the physical layer in Ethernet (registered trademark), a MAC layer and a physical layer are not limited to those in Ethernet. For example, the communication unit 300 may process any MAC layer and any physical layer in IEEE802.11 or the like. Although the communication protocol processing unit 301 uses RTP and HTTP, a communication protocol is not limited to the RTP and the HTTP. In the present invention, a communication protocol is not limited to a specific communication protocol. Received and transmitted data packets are not limited to IP packets. In the first, the second, and the third embodiments, packets contained in data blocks of received and transmitted data packets are MPEG2-TS packets but not limited to these.

The first time information extraction unit 304 and the second time information extraction unit may be integrated into one time information extraction unit.

The initialization unit 305 may set an initial value of third time information outputted by the timer unit 308 by using first time information associated with an MPEG2-TS packet other than an initially received MPEG2-TS packet.

Control of a frequency of a clock by means of the second time information comparison unit 400 and the receive data amount measuring unit 306 in the third embodiment may be performed at timing other than the timing shown in the above-mentioned third embodiment.

While the invention has been described in detail, the foregoing description is in all aspects illustrative and not restrictive. It is understood that numerous other modifications and variations can be devised without departing from the scope of the invention.

The data reception device according to the present invention is capable of reproducing time intervals between packets contained in a data packet and useful for video distribution, video transmission or the like, in which packets such as an MPEG2-TS are transmitted via an asynchronous transmission line in Ethernet (registered trademark), IEEE802.11 or the like.

The invention claimed is:

1. A data reception device for receiving a data packet containing a plurality of packets, each packet of the plurality of packets having first time information added thereto, and the first time information regarding a time at which the plurality of packets are generated, the data reception device comprising:
    a receive data buffer unit for storing the plurality of packets contained in the data packet;
    a receive data amount measuring unit for measuring an amount of data stored in the receive data buffer unit to obtain a measured value;
    a variable clock generation unit for generating a clock having a variable frequency;
    a time information output unit for outputting second time information that is counted in accordance with a frequency of the clock generated by the variable clock generation unit; and
    a first time information comparison unit for comparing the first time information added to the plurality of packets with the second time information outputted from the time information output unit, the second time information indicating a time that is behind by a predetermined offset time, and for controlling a timing of outputting the plurality of the packets stored in the receive data buffer unit,
    wherein the receive data amount measuring unit controls the frequency of the clock generated by the variable clock generation unit in accordance with the measured value obtained by the receive data amount measuring unit, and
    wherein the time information output unit comprises:
        a timer unit for outputting third time information that is counted in accordance with the frequency of the clock generated by the variable clock generation unit;
        a time information extraction unit for extracting the first time information added to the plurality of packets stored in the receive data buffer unit;
        an initialization unit for coinciding the third time information outputted by the timer unit with the first time information extracted by the time information extraction unit; and
        an offset unit for delaying, by the predetermined offset time, the third time information output by the time unit to obtain the second time information and for outputting the second time information.

2. The data reception device according to claim 1, wherein the offset unit changes the predetermined offset time in accordance with a condition of a transmission line to which the data reception device is connected.

3. The data reception device according to claim 1, wherein the offset unit changes the predetermined offset time in accordance with an amount of data accumulated in the receive data buffer unit.

4. The data reception device according to claim 1, wherein the offset unit changes the predetermined offset time in accordance with a type of a communication protocol.

5. The data reception device according to claim 1, further comprising a second time information comparison unit for comparing the third time information outputted by the timer unit with the first time information extracted by the time information extraction unit and for controlling, based on a result of the comparison, the frequency of the clock generated by the variable clock generation unit.

6. The data reception device according to claim 5,
    wherein, until a predetermined time from a time point of starting the reception of the data packet has passed, the frequency of the clock generated by the variable clock generation unit is controlled by the second time information comparison unit, and
    wherein after the predetermined time from the time point of starting the reception of the data packet has passed, the frequency of the clock generated by the variable clock generation unit is controlled by the receive data amount measuring unit.

7. The data reception device according to claim 1, wherein after a predetermined time has passed, the receive data amount measuring unit starts controlling the frequency of the clock generated by the variable clock generation unit.

8. The data reception device according to claim 1, wherein the receive data amount measuring unit controls the frequency of the clock generated by the variable clock generation unit by using an average value of data amounts accumulated in the receive data buffer unit, the average value being used as the measured value.

9. The data reception device according to claim 1, wherein the plurality of packets contained in the data packet are packets that are in an MPEG2-2TS format.

10. The data reception device according to claim 1,
    wherein as the data packet, audio signals and video signals are encoded to be generated as a plurality of packets that are in an MPEG2-TS format, each of the packets having the first time information regarding a time of the encoding added thereto, and
    wherein the packets that are in the MPEG2-TS format and that have the first time information added thereto are combined and transmitted from the data transmission device which is operable to generate the data packet.

11. An integrated circuit for receiving a data packet containing a plurality of packets, each packet of the plurality of packets having first time information added thereto, and the first time information regarding a time at which the plurality of packets are generated, the integrated circuit comprising:
    a receive data amount measuring unit for measuring an amount of data stored in a receive data buffer unit that is connected to the integrated circuit and that stores the plurality of packets contained in the data packet, the measured amount of data being used to obtain a measured value;

a variable clock generation unit for generating a clock having a variable frequency;

a time information output unit for outputting second time information that is counted in accordance with a frequency of the clock generated by the variable clock generation unit; and a first time information comparison unit for comparing the first time information added to the plurality of packets with the second time information outputted by the time information output unit, the second time information indicating a time that is behind by a predetermined offset time, and for controlling a timing of outputting the plurality of packets stored in the receive data buffer unit, wherein the receive data amount measuring unit controls the frequency of the clock generated by the variable clock generation unit in accordance with the measured value obtained by the receive data amount measuring unit, and wherein the time information output unit comprises:

a timer unit for outputting third time information that is counted in accordance with the frequency of the clock generated by the variable clock generation unit;

a time information extraction unit for extracting the first time information added to the plurality of packets stored in the receive data buffer unit;

an initialization unit for coinciding the third time information outputted by the timer unit with the first time information extracted by the time information extraction unit; and an offset unit for delaying, by the predetermined offset time, the third time information output by the time unit to obtain the second time information and for outputting the second time information.

* * * * *